US010200270B2

(12) United States Patent
Scholz et al.

(10) Patent No.: US 10,200,270 B2
(45) Date of Patent: Feb. 5, 2019

(54) CORRELATION OF MEDIA PLANE AND SIGNALING PLANE OF MEDIA SERVICES IN A PACKET-SWITCHED NETWORK

(75) Inventors: Hendrik Scholz, Hamburg (DE); Michael Krueger, Hamburg (DE); Jan Bastian, Hamburg (DE); Michael Wallbaum, Hamburg (DE)

(73) Assignee: VOIPFUTURE GMBH, Hamburg (DE)

( * ) Notice: Subject to any disclaimer, the term of this patent is extended or adjusted under 35 U.S.C. 154(b) by 791 days.

(21) Appl. No.: 14/114,306

(22) PCT Filed: Apr. 28, 2011

(86) PCT No.: PCT/EP2011/002145
§ 371 (c)(1),
(2), (4) Date: Dec. 4, 2013

(87) PCT Pub. No.: WO2012/146265
PCT Pub. Date: Nov. 1, 2012

(65) Prior Publication Data
US 2014/0089504 A1    Mar. 27, 2014

(51) Int. Cl.
*G06F 15/173* (2006.01)
*H04L 12/26* (2006.01)
(Continued)

(52) U.S. Cl.
CPC .......... *H04L 43/12* (2013.01); *H04L 41/5032* (2013.01); *H04L 43/062* (2013.01);
(Continued)

(58) Field of Classification Search
CPC ..... H04L 43/12; H04L 43/062; H04L 67/146; H04L 65/607; H04L 65/608; H04L 65/80; G06F 15/16
(Continued)

(56) References Cited

U.S. PATENT DOCUMENTS

2003/0097564 A1* 5/2003 Tewari .................... H04L 12/14
                                                    713/171
2003/0129986 A1* 7/2003 Blair ........................ G10L 17/26
                                                    455/450
(Continued)

FOREIGN PATENT DOCUMENTS

WO    WO 2010/106075 A1    9/2010

OTHER PUBLICATIONS

"VoIP Measurement Architecture Using Data Mediation" by Atsushi Kobayashi et al., http://link.springer.com/book/10.1007/978-3-642-04968-2.*
(Continued)

*Primary Examiner* — Larry D Donaghue
*Assistant Examiner* — Patrick Ngankam
(74) *Attorney, Agent, or Firm* — Wood, Phillips, Katz, Clark & Mortimer

(57) ABSTRACT

This invention relates to methods for correlating media streams and signaling sessions of services, for example, in a passive monitoring system of a packet-switched network. Furthermore, the invention also relates to an implementation of these methods in hardware and software, and provides a signaling plane probe, a media plane probe and a correlation unit. Moreover, a passive monitoring system comprising one or more of these hardware devices is provided. To correlate media streams and signaling sessions of services, the invention proposes to independently generate correlation keys in a media plane probe for monitored media streams and correlation keys for signaling sessions that are monitored by a signaling plane probe in a fashion that matching correlation keys are generated for a respective service. By identifying reports on the media streams and reports on the signaling session that contain matching correlation keys
(Continued)

respectively, the media streams and the signaling streams are correlated in a correlation unit.

21 Claims, 11 Drawing Sheets

(51) Int. Cl.
*H04L 12/24* (2006.01)
*H04L 29/06* (2006.01)

(52) U.S. Cl.
CPC ...... *H04L 65/1006* (2013.01); *H04L 65/1009* (2013.01); *H04L 65/1069* (2013.01); *H04L 65/607* (2013.01); *H04L 65/80* (2013.01)

(58) Field of Classification Search
USPC .......................................................... 709/224
See application file for complete search history.

(56) References Cited

U.S. PATENT DOCUMENTS

| | | | |
|---|---|---|---|
| 2004/0177276 A1* | 9/2004 | MacKinnon | H04L 63/0263 726/5 |
| 2005/0195745 A1* | 9/2005 | Scott | H04L 29/06027 370/241 |
| 2008/0151918 A1* | 6/2008 | Foti | H04L 65/1069 370/410 |
| 2010/0179968 A1* | 7/2010 | Ayari | H04L 65/4007 707/802 |
| 2011/0216762 A1* | 9/2011 | Nas | H04L 12/66 370/352 |
| 2011/0252127 A1* | 10/2011 | Iyengar | G06F 9/5033 709/224 |
| 2012/0036277 A1* | 2/2012 | Stokking | H04N 7/24 709/231 |

OTHER PUBLICATIONS

Atsushi Kobayashi et al. "VoIP Measurement Architecture Using Data Mediation", http://link.springer.com/chapter/10.1007/978-3-642-04968-2_2.*

International Search Report for corresponding PCT Application No. PCT/EP2011/002145 dated Jan. 17, 2012.

"VoIP Measurement Architecture Using Data Mediation" by Atsushi Kobayashi et al. cited in the International Search Report for corresponding PCT Application No. PCT/EP2011/002145.

* cited by examiner

CORRELATION OF MEDIA PLANE AND SIGNALING PLANE OF MEDIA SERVICES IN A PACKET-SWITCHED NETWORK

FIELD OF THE INVENTION

This invention relates to methods for correlating media streams and signaling sessions of services, for example, in a passive monitoring system of a packet-switched network. Furthermore, the invention also relates to an implementation of these methods in hardware and software, and provides a signaling plane probe, a media plane probe and a correlation unit. Moreover, a passive monitoring system comprising one or more of these hardware devices is provided.

TECHNICAL BACKGROUND

VoIP Services

VoIP ("Voice over IP"—IP denoting the Internet Protocol) services may be considered to consist of a signaling plane and a media plane. On the signaling plane various protocols describe the session (call) flow in terms of involved parties, intermediary VoIP entities (i.e. VoIP proxies, routers) and the characteristics of the VoIP service (call). The media plane typically carries the media information (i.e. audio and/or video data) between the involved parties. Neither the media plane nor the signaling plane alone is sufficient to carry a VoIP service. On the signaling plane protocols like SIP (see IETF RFC 3261, "SIP: Session Initiation Protocol", available at http://www.ietf.org) or ITU-T recommendation H.323 (see H.323, "Packet-based multimedia communications systems", Edition 7, 2009, available at http://www.itu.int) are commonly used, whereas protocols like RTP (Real-time Transport Protocol, see IETF RFC 3550, "RTP: A Transport Protocol for Real-Time Applications", available at http://www.ietf.org), MSRP (see IETF RFC 4975, "The Message Session Relay Protocol (MSRP)", available at http://www.ietf.org) or ITU recommendation T.38 (see T.38, "Procedures for real-time Group 3 facsimile communication over IP networks", Edition 5 (2007) or Edition 6 (2010), available at http://www.itu.int) may be present on the media plane. In contrast to the traditional PSTN (Public Switched Telephone Network) network both planes may be on different infrastructure using different protocols and even take different routes through a network.

Correlation Information

The property of disjunct signaling stream(s) and media stream(s) of a VoIP service within packet-switched networks may necessitate a correlation mechanism. This correlation may only be based on the common parameters carried on both planes of the session. Monitoring equipment used in VoIP networks may be limited to either the signaling or media plane due to the network structure. A correlation of signaling stream(s) and media stream(s) is thus needed outside the VoIP network in between the monitoring components.

In RTP-based VoIP networks the data basis is rather limited as defined by the RTP protocol and the underlying transport and Internet layer protocols. An RTP stream which typically carries voice or video information from one party to another of a VoIP service is made up of plural RTP packets. The header of each RTP packet does not contain an identifier which can be used to distinctively associate single RTP packets or the entire RTP stream to a VoIP service (defined by the VoIP signaling). The same way the VoIP signaling protocol does not carry information to relate a signaling session (signaling plane of the VoIP service) to RTP protocol header information.

The parties originating or receiving a VoIP service actively dictate the transport and Internet layer address (IP address and port) on which they want to receive media streams. This configuration is done on the signaling plane. Using SIP as a signaling protocol, the address tuple(s) to be used on the media plane is/are defined in a so-called SDP body (see IETF RFC 3264, "An Offer/Answer Model with the Session Description Protocol (SDP)", available at http://www.ietf.org). The address tuple(s)—usually consisting of an IP address and port—is/are the sole information to correlate media plane of a VoIP service with the signaling plane of the VoIP service, and vice versa.

Challenges in Correlation of Signaling Plane and Media Plane

Beside the limited information available for correlation, the correlation of the signaling plane and media plane imposes also numerous further challenges, especially in passive mid-point monitoring scenarios. While an address tuple (IP address and port) may be enough information to identify a single RTP stream at a given point in time, multiple streams identified by different address tuples may exist in a regular VoIP call. In fact at least two media streams are needed to allow two-way communication between the caller and callee.

It will be outlined in further detail in the following how multiple media streams may occur in a single VoIP service and how they are communicated between the parties involved (which may not always be the case).

Mid-point monitoring equipment (i.e. the signaling and media probes) is introduced into the network path which active components (e.g. VoIP phones and servers) use to communicate with each other. This passive equipment is not involved in the communication itself and has to derive all information from the network packets it observes on said network path. The correlation challenge increases as the passive equipment lacks information the active components internally have. A VoIP phone may internally assign a media port to a signaling session but never send out this information combined so that a mid-point monitoring probe could benefit from this information.

Time Constraints Due to Port Reuse

The IP address and port combination transmitted inside the signaling plane of a VoIP service as well as the IP address and port observed on the media plane of the VoIP service may be reused. For exemplary purposes it can be assumed that each VoIP device has a single IP address. The port range from which the client can draw is limited to roughly 65000 ports by the underlying transport layer protocol UDP (see RFC 768, "User Datagram Protocol", available at http://www.ietf.org). In practice additional specifications and configuration parameters significantly further limit this port range. RFC 3550 which defines the Real-Time Transport Protocol mandates that only even port numbers may be used to transport media streams. The odd ports are reserved for Real-Time Transport Control Protocol (RTCP) packets. This standardization alone effectively halves the number of ports available for VoIP communication.

As a result a VoIP device has to re-use a certain IP address and port combination, thus eliminating a unique identification criterion. Essentially the IP address and port combination can only be assumed to be unique for a limited amount of time. The time-frame depends on the utilization of the VoIP device as well as the number of IP addresses required in an Internet Service Provider's network. If a correlation of the signaling and media plane takes place without a time criteria, it would therefore produce so-called false positives: Multiple media streams would match the requested IP address and port combination, since the signaling plane may have caused re-use of the very same IP address and/or port for another VoIP service.

Media Streams

Multiple streams may exist per direction of each VoIP service. The caller sends data to the callee and vice versa resulting in at least one media stream per direction. Desirable features, such as for example codec changes, may trigger additional streams. On the network multiple streams may use the same IP address and port tuple depending on the media protocol. For example, each RTP stream is additionally identified by a unique identifier—the Sender Synchronization Source (SSRC)—which is used to distinguish between multiple streams.

FIG. 1 shows exemplary situations where multiple media streams may be triggered. The focus is on the media plane traffic and its timing. The x-axis denotes the time basis, starting on the left side. The vertical lines in FIG. 1 denote signaling events and the bold horizontal lines are RTP streams present in the respective exemplified VoIP service example (please note that the different VoIP service examples are separated by broken horizontal lines). Only the RTP stream direction from the callee to the caller is shown per VoIP service example. The RTP stream from the caller to the callee can be assumed to be less complex (e.g. as shown in the "normal" VoIP service example).

The three vertical lines denote important events in the phase of a call. The leftmost line denotes the start timestamp. This is the time at which the caller submitted the call setup request to the network. The connected point is the timestamp at which a callee or his endpoint/handset picked up and moved the service into a fully established state. The service ends when one of the parties sends a termination request.

The most common VoIP services will be the trivial session examples where there is only one RTP stream per direction (see "normal" or "early media"). In a "normal" VoIP service flow both parties only start sending once the session is fully established on the signaling plane. More often the callee would start sending early media, i.e. when sending ring-tones or (pre-call) announcements. In "session forking" VoIP service example there may be multiple concurrent or sequential RTP streams at the beginning of a service e.g. due ring-tones being sent to multiple VoIP devices of the callee, while one is answered at the connect event During a service media codecs may be changed (see "code change" VOIP service example) which is commonly resulting in a new media stream. Another service scenario may be the VoIP call being put on hold and picked up at a later time essentially generating multiple media streams (see "call on hold" VoIP service example). Silence suppression and other RTP features may cause multiple streams sporadically during a service (see "silence suppression" VoIP service example). Also retransmissions on the signaling plane may desynchronize the signaling plane and media plane (see "SIP retransmissions" VoIP service examples).

Geographic Distribution or Media Plane and Signaling Plane

As indicated above, signaling plane data and media plane data of VoIP services may take different routes. In examples, where SIP is used for session setup, this is indeed the case as those sessions usually contain signaling-only components (i.e. SIP proxies, REGISTRARs). As a result passive mid-point monitoring solutions may be split geographically along the routes of the VoIP traffic.

An exemplary passive mid-point monitoring scenario for this case is shown in FIG. 2. FIG. 2 shows three geographically distributed POPs (Point of Presence) which are linked over the carrier's internal network. The signaling data flows on the signaling plane between POP A and B via the signaling-only POP C. POP C would typically host a centralized routing entity which reduces the complexity in the POPs A and B. To prevent back-hauling traffic from POP A to POP C before sending it to POP B the VoIP system is configured in a way that would allow the media to flow directly on the media plane between POPs A and B.

Typical mid-point monitoring locations would be inside each POP. Due to the layout of the network no media traffic would be visible in POP C. To allow for successful correlation of signaling and media streams by the correlation mechanism it is therefore desirable to support distributed networks. If the same session traverses multiple POPs it would be desirable for the correlation mechanism to identify this and support correlation of the session legs across multiple sites.

Limitations/Challenges in Correlation of Signaling Plane and Media Plane

The correlation may be solely based on the IP address and port used on the transport and Internet layer. On the media plane each RTP stream is destined to exactly one IP address and port on the transport layer. On the signaling plane one IP address and port is typically exchanged inside the Session Description Body of the SDP protocol during the VoIP service setup. However this IP address and port combination may not be the combination used throughout the VoIP service. In this case the above mentioned correlation mechanism fails: It fails upon searching a media stream for a specific signaling session of the VoIP service. The same way it fails to locate a signaling session of the VoIP service for a specific media stream on the media plane. The reasons for using another IP address port combination than advertised upon session setup are manifold.

Network Address Translation (NAT)

Network Address Translation (NAT, RFC 1631) was developed to solve Internet address space depletion and routing problems. In today's Internet one may distinguish between internal addresses which are often only unique locally (i.e. typically used inside company or home networks), and external addresses of global validity and uniqueness as used on the public Internet.

FIG. 3 shows an exemplary network using internal and external addresses. The internal network on the left side uses IP addresses from the so-called private space, as for example defined in IETF RFC 1918, "Address Allocation for Private Internets", available at http://www.ietf.org. The external network on the right side is the public Internet with globally reachable addresses. A router with embedded Network Address Translation (NAT) functionality is located in between the two networks. The router does not directly route packets in between the two connected networks, but "translates" (i.e. replaces) IP source and destination addresses within the routed IP packets on demand.

Essentially, the NAT functionality of the router hides the entire internal network (10.0.0.0/8 in this example) behind one public IP address (192.0.2.1). Every IP connection from within the internal network to the Internet will seem to originate from the sole public IP address (192.0.2.1) of the entire network.

For each node inside the internal network this imposes some limitations. Although Internet access works in general, a node in the internal network may not be reachable from the outside. This is due to the fact that IP traffic from an outside node (i.e. a node in the external network) would be destined to the public IP address (192.0.2.1), but the router with this IP address does not know at this point in time where to forward the traffic to on the internal network, given that there was no prior communication from an node inside of the internal network and the external node.

Additionally the internal node may not be aware that it is behind a router which performs the NAT. As required by the transport protocols, the internal node will use the internal IP address for communication purposes. On the VoIP signaling and media layer (i.e. session layer or application layer), the application will also use the internal IP address (i.e. 10.0.0.123) instead of the public IP address. VoIP signaling protocols (e.g. SIP or H.323) contain various IP addresses on the application layer. An intermediary NAT device (i.e. the router in FIG. 3) will not perform translation of the addresses on the session layer or application layer, but only translates IP addresses in the network layer. The internal IP addresses inside the VoIP signaling (i.e. SIP or H.323 messages) impose a problem to the application as internal IP addresses are most likely not reachable from the public Internet.

VoIP devices involved in the processing of a certain call may detect this problem by comparing the IP addresses seen on the Internet and transport layers with the IP addresses set on the application layer. The following message is an exemplary SIP message as seen on the network and transport layer, which means that both the Internet and transport layer information (IP addresses and ports) are visible:

U  2010/09/09  13:57:31.925226  192.0.2.99: 37682→10.0.0.1:5060

The Internet and transport layers show that the UDP packet (U) was received from the external address 192.0.2.99 (port 37682).

The following message represents the same exemplary SIP message as seen on the application layer, which means that both the Internet and transport layer information (IP addresses and ports) as well as the application layer (SIP message contents) are visible:

INVITE sip:echo@example.com SIP/2.0
Via: SIP/2.0/UDP
  192.168.1.216;branch=z9hG4bK3BB64874;
    rport=37682;received=192.0.2.99
CSeq: 7726 INVITE
To: <sip:echo@example.com>
Content-Type: application/sdp
From:  "John  Doe"<sip:jdoe@example.com>;
  tag=693C7725
Call-ID: 1341723561@192.168.1.216
Subject: sip:jdoe@example.com
Content-Length: 230
User-Agent: kphone/4.2
Contact:  "John  Doe"<sip:jdoe@192.168.1.216;
  transport=udp>
v=0
o=username 0 0 IN IP4 192.168.1.216
s=The Funky Flow
c=IN IP4 192.168.1.216
t=0 0
m=audio 60942 RTP/AVP 0 97 8 3
a=rtpmap:0 PCMU/8000
a=rtpmap:3 GSM/8000
a=rtpmap:8 PCMA/8000
a=rtpmap:97 iLBC/8000
a=fmtp:97 mode=30

In contrast to the information available at the network and transport layers claiming that the message was received from the external address 192.0.2.99 (port 37682), the application claims that the source was the internal address 192.168.1.216 (port 5060—the port 5060 is not viewed for the source address as it is the default port).

In general the translation of the network (IP) address also applies to the port numbers which are used on the transport layer. This feature is named Port Address Translation (PAT). NAT and PAT commonly happen at the same time in the same device.

PAT becomes necessary if multiple devices attempt to use the same port. Since different devices have different IP addresses their IP address and port tuple is unique. If packet streams from both devices traverse the same NAT device, the NAT device has to translate the port of one of the two packet streams. Otherwise there would be two distinct packet streams sharing the same external IP address of the NAT device and the same port. While this may not be a problem if the destination IP address and port tuple of the destination device are different for the two packet streams, it adds overhead which the NAT device wants to prevent. By rewriting the source port of one of the packet streams the address tuples of the external IP address and ports become unique again.

However, in networks where NAT (and PAT) is performed to for example hide private networks from the outside Internet, the correlation of signaling sessions of VoIP services and the associated media plane streams is becoming complex.

Multiple Communication Paths

Numerous solutions have been developed to allow traffic of VoIP services to operate in networks with Network Address Translation (NAT). These mechanisms require the involved caller and callee to exchange information, for instance on additional transport protocols or addresses which can be used to reach the remote party. These include—but are not limited to—IPv6 (Internet Protocol Version 6, see IETF RFC 2460, "Internet Protocol, Version 6 (IPv6), Specification"), TURN (Traversal Using Relays around NAT, see IETF RFC 5766, "Traversal Using Relays around NAT (TURN):Relay Extensions to Session Traversal Utilities for NAT (STUN)") addresses or ICE (Interactive Connection Establishment, see IETF RFC 5245, "Interactive Connectivity Establishment (ICE): A Protocol for Network Address Translator (NAT) Traversal for Offer/Answer Protocols") candidates (all RFCs available at http://www.ietf.org).

These additional tuples of IP addresses and ports communicated in these solutions establish different data paths in media plane and signaling plane of a VoIP service and thereby break up the previous one-to-one relation of signaling session to media stream to a given VoIP device. Previously one media stream to the given VoIP device could be distinctively identified by exactly one IP address and port. In the new scenario on the signaling plane a list of IP address and port tuples is transported on which the VoIP device may receive media thereby increasing the complexity of correlation between media plane and signaling plane of a VoIP service.

SUMMARY OF THE INVENTION

One object of the invention is to suggest correlation mechanisms that allow overcoming one or more of the limitations and challenges on the correlation of signaling plane and media plane of services.

The object is solved by the subject matter of the independent claims. Advantageous embodiments of the invention are subject to the dependent claims.

One of the various aspects of the invention is to suggest a definition of correlation keys that allow the correlation of media streams of services and the associated signaling session of the respective services based on data records (reports) that provide information on the media plane and signaling plane of the respective services. These correlation keys may be for example provided in form of hash keys. A correlation key may be associated to a given direction of the media data paths of the media streams belonging to a given service (e.g. caller-to-callee or callee-to-caller for a simple bi-directional service, e.g. VoIP call). Hence, assuming that the service comprises at least two media streams of different directions, at least two correlation keys are provided on the signaling plane for later correlation of the media plane and signaling plane of the service. On the media plane one correlation key is provided per media stream.

The correlation keys for use in correlation are generated by a media plane probe and a signaling plane probe independently from each other, but the two probes generate matching correlation keys for a given media service (i.e. the signaling plane probe and the media plane probe independently each generate the same correlation key for a given direction/media data path of the media service, given that there are not any exceptional situations preventing the match of the correlation keys).

In response to the detection of the end of a signaling session, the signaling plane probe generates for this signaling session at least one correlation key for each "direction" of the service to which the signaling session belongs. Each correlation key (e.g. hash key) is generated by the signaling plane probe based on a timestamp indicative of the point in time at which the end of the respective signaling session has been detected by the signaling plane probe and using information on respective direction of the media plane data flow (e.g. caller-to-callee or callee-to-caller for a simple bi-directional service, e.g. VoIP call). The correlation keys generated for the different directions of the service corresponding to the signaling session the end of which has been detected are then collated in a signaling session report, which may be for example stored in a database or a flat file.

For the media plane, the media plane probe generates a correlation key (e.g. hash key) for each media stream. The correlation keys for the media steams are generated upon the media plane probe detecting the end of the respective media stream. The correlation key for a respective terminated media stream is generated by the media plane probe based on the direction of the respective media stream, e.g. based on the media data path of a media stream, and on a timestamp indicative of the point in time at which the respective media stream has ended. The timestamp at which the respective media stream has ended is for example the time at which the last packet of the media stream has been received by the media plane probe. The media plane probe stores the correlation key (e.g. hash key) for the media stream in a media stream report, which may be for example stored in a database or exported as a flat file.

Another aspect of the invention is the use of the correlation keys comprised in the signaling session reports and the media stream reports to identify the media streams and signaling session belonging to a single media service. As indicated above, the correlation keys generated by the signaling plane probe and the media plane probe should be matching each other (i.e. the correlation keys of a given signaling session report should be found in the media stream reports, respectively, the correlation key of a media stream report should be found in one of the signaling session reports), provided that signaling session and related media streams are terminated nearly at the same point in time, i.e. within a given timeframe.

Hence, a correlation unit can identify which media streams belong to which signaling session (or vice versa) and may therefore generate a service record that summarizes a service based on information contained in the media stream reports and information contained in the signaling session report of the respective service.

According to one exemplary embodiment of the invention, a method for correlating media streams and signaling sessions of services in a passive monitoring system of a packet-switched network is provided. It is assumed for exemplary purposes that one service has one signaling session.

In this method a signaling plane probe generates at least one correlation key for each direction of a service based on the information of the signaling session of the respective service monitored at the signaling plane probe. As noted above the direction may be equivalent to a respective media data path of a media stream belonging to a given service. The correlation keys for a respective service may be generated using a timestamp indicative of the point in time at which the end of the respective signaling session of the respective service has been detected by the signaling plane probe and using information on the direction of the respective service. Furthermore, the signaling plane probe stores a signaling session report for each signaling session in a database. Each of the signaling session reports comprises at least two correlation keys generated for the respective directions of the service.

Moreover, in this method a media plane probe also generates a correlation key for each media stream monitored by the media plane probe. The media plane probe generates the correlation key using a timestamp indicative of the point in time of the end of the respective media stream as detected by the media plane probe and using information on the media data path of the respective media stream. The media plane probe stores a media stream report for each media stream in a database, wherein each media stream report comprises at least the correlation key generated for the respective media.

A correlation unit further correlates the media streams and the signaling sessions based on the correlation keys comprised within media stream reports and signaling session reports.

In a more detailed exemplary embodiment of the invention, the generation of the respective correlation keys for the respective media streams by the media plane probe is based on the media data path information of the respective media stream and the timestamp indicative of the point in time at which the respective media stream ended.

According to another exemplary embodiment of the invention, information on the direction of the respective service—based on which the correlation keys are generated by signaling plane probe for a respective service—is information on one or more media data paths of media streams of the service learned from messages of the signaling session of the service. In other words, the direction of the service may be for example given by the media data path which is yielding a given direction. For example in a simple VoIP call between two peer devices, there are two directions: caller-to-callee and callee-to-caller as noted above.

In a further embodiment of the invention, the signaling plane probe monitors signaling messages of the respective signaling sessions of the services, and detects media streams belonging to each service associated to a respective monitored signaling session based on the signaling messages of the respective signaling sessions. The correlation keys for a respective one of the signaling sessions may be generated by the signaling plane probe based on information on the media data path of the media streams belonging to the service associated to the respective one of the signaling sessions and the timestamp indicative of the point in time at which the end of the respective signaling session has been detected by the signaling plane probe. For example, in one possible implementation information on a media data path of a media stream is a destination IP address and port number of the media stream.

In another embodiment, the timestamps used for the generation of the correlation keys by the signaling plane probe and the media plane probe could be for example rounded (e.g. in a configurable or fixed interval) before the generation of the correlation keys, in order to ensure that timing differences in the events monitored in the media plane and signaling plane of the services do not lead to generation of non-matching correlation keys for a given service. Alternatively, in another exemplary implementation, the timestamps—by default—have a granularity that is higher than one second, e.g. a granularity in the range of one to ten seconds.

In a further embodiment, instead of storing a single correlation key per direction of a signaling session or per media stream, additional correlation keys may be generated and stored. The input for these additional correlation keys are the same IP address and port information, but a different timestamp. For example, the signaling plane probe could calculate an additional correlation key using a timestamp earlier than the timestamp indicative of the end of the respective signaling session.

In case of using a rounded timestamp this earlier timestamp may be the next earlier rounded timestamp before the rounded timestamp indicative of the end of the respective signaling session. In one exemplary implementation, the signaling plane probe could generate two timestamps from a (non-rounded) timestamp indicative of the end of the respective signaling session which are each used together with the same IP address and port information to generate two respective correlation keys for a given direction: One of these two generated timestamps used for calculation of the correlation keys may be the timestamp indicative of the end of the respective signaling session rounded to the nearest lower value according to the rounding interval, while the other of these two generated timestamps may be the timestamp indicative of the end of the respective signaling session rounded to the nearest higher value according to the rounding interval.

All correlation keys that are generated by the signaling plane probe for a given direction may be stored as part of the signaling session records.

In a similar fashion as described above for the signaling plane probe and the directions indicated in the signaling, also the media plane probe may optionally generate more than one correlation key for a given media data path/media stream. In case of using rounded timestamps also the media plane probe could generate two timestamps from a (non-rounded) timestamp indicative of the end of the respective media stream which are each used together with the same IP address and port information of the media stream to generate two respective correlation keys. One of the two timestamps generated by the media plane probe may be the timestamp indicative of the end of the respective media stream rounded to the nearest lower value according to the rounding interval, while the other of these two generated timestamps may be the timestamp indicative of the end of the respective media stream rounded to the nearest higher value according to the rounding interval. All correlation keys that are generated by the media plane probe for a given media stream may be stored as part of the media stream records.

In case of rounding timestamps in the media plane probe and the signaling plane probe, the rounding interval in both probes should be identical. The gain of having both probes generating additional correlation keys and correlating a multitude of correlation keys may not reflect in the increased processing needs.

In a further exemplary embodiment of the invention, the correlation of the media streams and the signaling session of the respective services is performed by a correlation unit periodically or in response to a query.

Another exemplary embodiment of the invention is related to a method for correlating media streams and signaling sessions of services. According to this method a correlation unit correlates the media streams and the signaling sessions of one or more services based on the correlation keys comprised within media stream reports of the media streams and signaling session reports of the signaling sessions to thereby identify the media stream reports and signaling session report belonging to a respective one of said one or more services. For correlating media streams and the signaling sessions, the correlation unit identifies one or more media streams of a respective service and the corresponding signaling session of the respective service based on the correlation keys comprised in the media stream reports and signaling session reports. Further, the correlation unit generates a service record for a respective one of said at least one service based on information contained in the media stream reports and information contained in the signaling session report of said at least one service.

In one exemplary implementation, these steps are performed by a correlation unit periodically for all signaling session reports and media stream reports generated within a configurable time interval, or in response to a request.

In case the correlation unit is unable to match one or more media streams to said signaling session report, the correlation unit may optionally generate a service record without quality information of the media streams of the service or may optionally generate a corresponding indication of the user/operator of the correlation unit.

A service report generated for a service by the correlation unit may comprise—according to one exemplary implementation—information on the service and the quality information of the media streams of the service.

In one exemplary implementation, the correlation keys provided in a respective signaling session report may have been generated using a timestamp indicative of the point in time at which the end of the respective signaling session of the corresponding service has been detected and using information on the media streams of the service. Similarly, the correlation keys provided in a respective media stream report may have been generated using a timestamp indicative of the point in time at which the respective media stream ended and using information on the media data path of the media stream.

In one further exemplary implementation, the correlation unit first attempts a correlation of media stream reports and signaling session reports using the correlation keys that have been generated based on the timestamps indicative of the end of the signaling session, respectively, the end of the media stream(s). In case the correlation is unsuccessful, the correlation unit may further use optionally available additional correlation keys contained in the signaling session reports and/or media plane reports which are based on other timestamps, e.g. before and after the actual end of the respective signaling session or media stream(s), respectively. This layered approach allows to first conduct the correlation using the correlation keys which are more likely to yield a result and as a fallback conduct the correlation using a wider timeframe.

According to a more detailed exemplary embodiment of the invention, the correlation of the media streams and the signaling sessions of one or more services based on the correlation keys comprised within media stream reports of the media streams and signaling session reports of the signaling sessions by the correlation unit comprises matching the respective correlation keys of the media stream reports of media streams are to the respective correlation keys of the signaling session reports, or vice versa. A match of the correlation keys of a one of the media stream reports and one of the signaling session reports (i.e. the two correlation keys are identical) yields that the media stream of said one media stream report belongs to the same (media) service to which the signaling session of said one signaling session report belongs.

In another exemplary embodiment of the invention, for correlating the media streams and the signaling sessions of one or more services by the correlation unit, same may obtain from a signaling session report correlation keys identifying the media streams belonging to the same service as the signaling session. Further the correlation unit could then identify those media stream reports which include one of the correlation keys obtained from the signaling session report.

Alternatively, in another exemplary embodiment, the correlation of the media streams and the signaling sessions of one or more services could also be implemented by the correlation unit obtaining from a media stream report a correlation key identifying the media stream, and further the correlation unit identifying a signaling session report among the signaling session reports which includes the same correlation key obtained from the signaling session report.

According to one exemplary embodiment of the invention, a method for correlating media streams and signaling sessions of services in a passive monitoring system of a packet-switched network is provided. It is assumed for exemplary purposes that one service has one signaling session.

Another embodiment of the invention is related to a passive monitoring system for correlating media streams and signaling sessions of services in a packet-switched network. The passive monitoring system comprises a signaling plane probe that generates at least one correlation key for each direction of a service based on the information of the signaling session of the respective service monitored at the signaling plane probe. As noted above, there may be one or more correlation keys for each direction of the service. The correlation keys for a respective service are generated by the signaling plane probe using a timestamp indicative of the point in time at which the end of the respective signaling session of the respective service has been detected by the signaling plane probe and further using information on the direction of the respective service (e.g. information on the media data path of the given direction, such as a destination IP address and UDP port number). The signaling plane probe stores a signaling session report for each signaling session in a database, wherein each signaling session report comprises the at least two correlation keys generated for the respective directions of the service.

Furthermore, the passive monitoring system also comprises a media plane probe for generating a correlation key for each media stream monitored by the media plane probe. The correlation key is generated using a timestamp indicative of the point in time at which the respective media stream has ended and using information on the media data path of the respective media stream. The media plane probe stores a media stream report for each media stream in a database. Each media stream report comprises at least the correlation key generated for the respective media.

The passive monitoring system further comprises a correlation unit for correlating the media streams and the signaling sessions based on the correlation keys comprised within media stream reports and signaling session reports. The correlation unit may for example use one of the different correlation methods described herein for this purpose.

Another embodiment of the invention is related to the design of the signaling plane probe. According to this embodiment of the invention, the signaling plane probe comprises a network interface card for receiving packets of signaling sessions of multiple media services and a monitoring unit for monitoring the signaling sessions based on the packets of the signaling sessions received by the signaling plane probe to thereby obtain information on a respective one of the signaling sessions. The monitoring unit of the signaling plane probe is further capable of detecting the point in time at which a respective signaling session of the respective service terminates.

The signaling plane probe also comprises a processing unit for generating at least one correlation key for each direction of a service based on a timestamp indicative of the point in time at which the end of the respective signaling session of the respective service has been detected by the monitoring unit and based on information on the direction of the respective service. Moreover, the monitoring unit stores a signaling session report for each signaling session in a database, wherein each signaling session report comprises at least two correlation keys generated for the respective directions of the service.

Another embodiment of the invention is related to a media plane probe which comprises a network interface card for receiving packets of media streams of multiple media services, and a monitoring unit for monitoring the media streams based on the packets of the media streams received by the media plane probe. Thereby the media plane probe obtains information on a media data path a respective one of the media stream. Further, the monitoring unit detects the point in time at which a respective media stream of the respective service terminates, and a processing unit of the media plane probe generates a correlation key for each media stream monitored by the monitoring unit. This correlation key may be for example generated using a timestamp indicative of the point in time at which the respective media stream has ended and using information on the media data path of the respective media stream.

The media plane probe's monitoring unit further stores a media stream report for each media stream in a database, wherein each media stream report comprises at least the correlation key generated for the respective media.

The invention according to another embodiment is related to a correlation unit capable of correlating media streams and signaling sessions of services in a passive monitoring system of a packet-switched network. The correlation unit comprises a database access unit for accessing a database comprising signaling session reports for signaling sessions of services and a database comprising media stream reports of media streams of the services. The signaling session reports each comprise at least one correlation key for each direction of a respective service, and the media stream reports each comprise one correlation key indicating the direction of the media stream. A processing unit of the correlation unit is used to correlate the media streams and the signaling sessions of the services based on the correlation keys comprised within media stream reports and signaling session reports to thereby identify the media stream reports and signaling session report belonging to a respective one of said one or more services. The processing unit identifies one or more media streams of a respective service and the corresponding signaling session of the respective service based on the correlation keys comprised in the media stream reports and signaling session reports. The correlation unit may further comprise a service record generation unit (e.g. implemented by a processing unit) for generating a service record for a respective service based on information comprised in the media stream reports and information comprised the signaling session report of said at least one service.

In a further embodiment of the invention, the correlation unit is further adapted, e.g. by comprised respective configured means, to perform the steps of the correlation methods according to one of the different embodiments described herein. Furthermore, also the signaling plane probe and the media plane probe may be adapted, e.g. by comprised respective configured means, to implement the different functions thereof as described herein.

Further embodiments of the invention relate to the implementation of the different functions of media plane probe, signaling plane probe and correlation unit in software. In this context, another embodiment of the invention provides a computer-readable medium storing instructions that, when executed by a processor of a signaling plane probe, cause the signaling plane probe to receive packets of signaling sessions of multiple media services, and to monitor the signaling sessions based on the packets of the signaling sessions received by the signaling plane probe to thereby obtain information on a respective one of the signaling sessions. The execution of the instructions further cause the signaling plane probe to detect the point in time at which a respective signaling session of the respective service terminates, and to generate at least one correlation key for each direction of a service based a timestamp indicative of the point in time at which the end of the respective signaling session of the respective service has been detected and based on information on the direction of the respective service. Moreover, the executed instructions may further cause the signaling plane probe to store a signaling session report for each signaling session in a database, wherein each signaling session report comprises the at least two correlation keys generated for the respective directions of the service.

Another exemplary embodiment of the invention is providing a computer-readable medium storing instructions that, when executed by a processor of a media plane probe, cause the media plane probe to receive packets of media streams of multiple media services, and to monitor the media streams based on the packets of the media streams received by the media plane probe to thereby obtain information on a media data path a respective one of the media streams. Moreover, the execution of the instructions cause the media plane probe to detect the point in time at which a respective media stream of the respective service terminates, and to generate a correlation key for each media stream monitored by the monitoring unit, wherein the correlation key is generated using a timestamp indicative of the point in time at which the respective media stream has ended and using information on the media data path of the respective media stream. Furthermore, the execution of the instructions may further cause the media plane probe to store a media stream report for each media stream in a database, wherein each media stream report comprises at least the correlation key generated for the respective media.

Another embodiment of the invention is providing a computer-readable medium storing instructions that, when executed by a correlation unit, cause the correlation unit to correlate media streams and signaling sessions of services in a passive monitoring system of a packet-switched network. The execution of the instructions cause the correlation unit to access a database comprising signaling session reports for signaling sessions of services and a database comprising media stream reports of media streams of the services. The signaling session reports each comprise at least one correlation key for each direction of a respective service, and the media stream reports each comprise one correlation key indication the direction of the media stream. The execution of the instructions further cause the correlation unit to correlate the media streams and the signaling sessions of the services based on the correlation keys comprised within media stream reports and signaling session reports to thereby identify the media stream reports and signaling session report belonging to a respective one of said one or more services and to identify one or more media streams of a respective service and the corresponding signaling session of the respective service based on the correlation keys comprised in the media stream reports and signaling session reports.

The execution of the instructions also cause the correlation unit to generate a service record for a respective one of said at least one service based on information comprised in the media stream reports and information comprised the signaling session report of said at least one service.

Another embodiment is providing a computer readable medium storing instruction that, when executed by the processor of the correlation unit, cause the correlation unit to perform the steps of the method for correlating media streams and signaling sessions of services according to one of the different embodiments described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
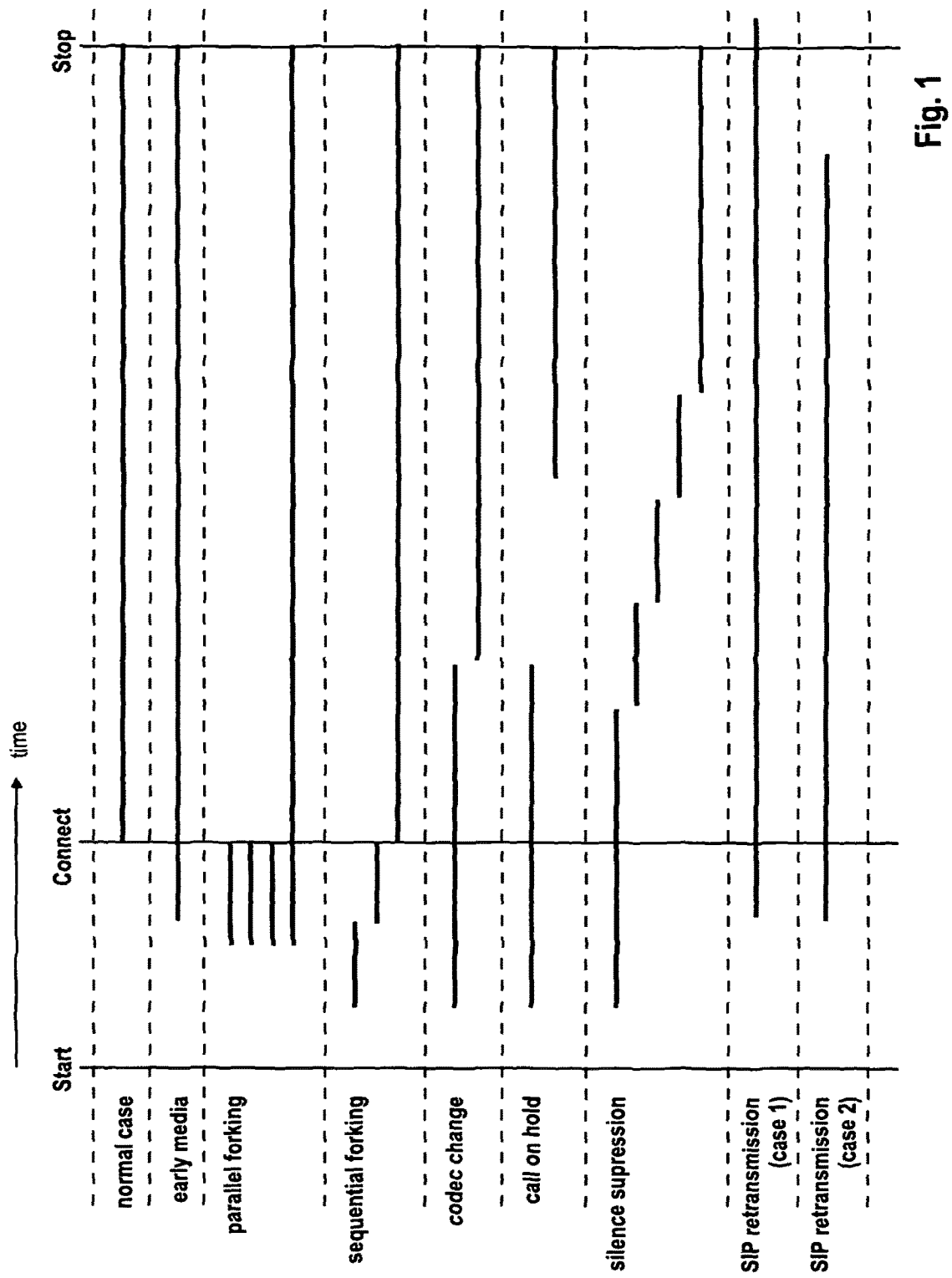
FIG. 1 shows exemplary situations where multiple media streams may be triggered in a media service.
Figure 2:
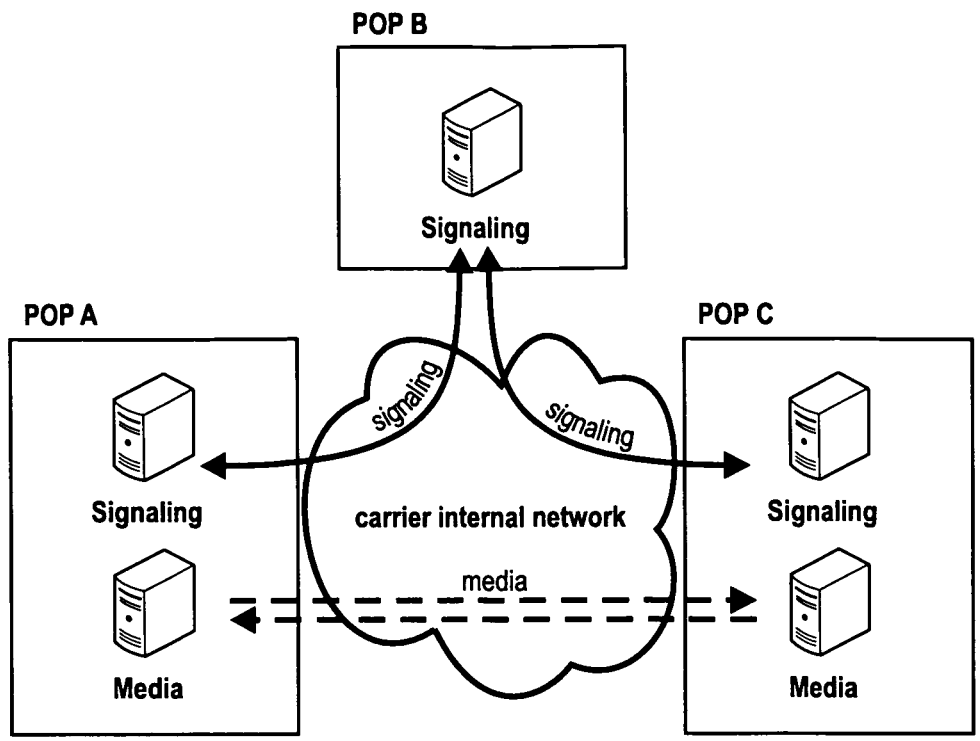
FIG. 2 shows three geographically distributed POPs (Point of Presence) which are linked over the carrier's internal network.
Figure 3:
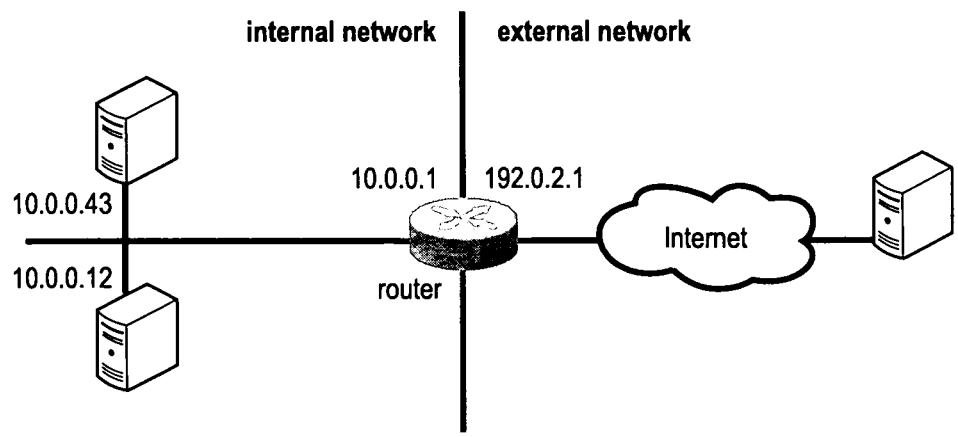
FIG. 3 shows an exemplary network using internal and external addresses.

The following paragraphs will describe various embodiments of the invention. For exemplary purposes only, most of the embodiments are outlined in relation mainly to VoIP services as an example for a media service, but the invention is not limited to VoIP services. For example, the invention may also be used for other types of media services provided in packet-switched networks. The invention may be advantageously used in media services which have signaling plane and media plane separated and/or taking different routes through the packet-switched network.

The explanations given in the Technical Background section above are intended to better understand the often VoIP call-related exemplary embodiments described herein and should not be understood as limiting the invention to the described specific implementations of processes and functions in a packet-switched communication network.

As indicated above, the invention generally relates to methods for correlating at least one media data path and a signaling session of a service in a passive monitoring system that is monitoring a packet-switched network. Furthermore, the invention also relates to an implementation of these methods in hardware and software, and provides a signaling plane probe, a media plane probe and a correlation unit, as well as passive monitoring system comprising same. Based on the assumption of disjunctive signaling and media components of a service, the correlation mechanism suggested herein supports correlation across multiple hosts connected via a network (e.g. a Local Area Network (LAN), Wide Area Network (WAN) or the Internet).

One of the various aspects of the invention is to suggest a definition of correlation keys that allow the correlation of media streams of services and the associated signaling session of the respective services based on data records (reports) that provide information on the media plane and signaling plane of the respective services. In the following these correlation keys are implemented as in form of hash keys for exemplary purposes. The correlation keys may be used to query database(s) to correlate media stream reports for media streams monitored by a media plane probe and a signaling session report on the signaling session provided by a signaling plane probe that belongs to the same service—it should be noted that for the proper functioning of the invention, it is not decisive whether media stream reports and signaling session reports are stored in the same or different databases, or whether there are even multiple database partitions provided. The media stream reports and signaling session reports may even be stored in files.

The correlation keys are generated by one or more media plane probes and one or more signaling plane probes that monitor a packet-switched network independently from each other. This independent calculation of the correlation keys facilitates distributed correlation spanning across multiple geographically distributed components or even across multiple vendors of software components. Furthermore, as will become more apparent from the following, for a given media data path—respectively a corresponding given direction—, the parameters that are used for generating correlation keys at the signaling plane probe(s) and the media plane probe(s) ensure that the identical correlation keys are generated for the given media data path by the signaling plane probe(s) and the media plane probe(s) to facilitate correlation. A respective correlation key may be associated to a given direction of the media data paths of the media streams belonging to a given service. For example, assuming for exemplary purposes a simple bi-directional service, e.g. VoIP call, there are two directions: caller-to-callee and callee-to-caller.

The signaling plane probe may generate a correlation key for each direction of the service. For example, the signaling plane probe generates one correlation key for the caller-to-callee direction and another correlation key for the callee-to-caller direction. However, the signaling plane probe may also generate multiple correlation keys per direction, as will be outlined below in further detail. Consequently, in case it is assumed that a service comprises at least two media streams of different directions, then at least two correlation keys are calculated by the signaling plane probe for later correlation of the media plane and signaling plane of the service. The correlation key for a given direction or media data path may be generated based on information on the direction or media data path, such as for example a tuple comprising the destination IP address and UDP port for a media stream in the service's media plane corresponding to the given direction or media data path. In addition, the generation of the correlation key is further based on a timestamp. With respect to the generation of the correlation key by the signaling plane probe, the timestamp may for example indicate the point in time at which the signaling plane probe has detected the end of the signaling session (and thus the service). In another exemplary implementation, the timestamp used in the generation of a correlation key for a media data path of a media stream in the media plane of the service could also be the point in time of the termination (end) of the media stream in the media plane detected by the signaling plane probe.

The signaling plane probe may generate the correlation keys for the different endpoints (the endpoint indicate a direction of the related media data flow) of a service upon detection of the end of a signaling session and additionally or alternatively, upon detection of the end of a media stream in the service's media plane. Typically but not limited thereto, there is one endpoint per direction, e.g. the caller and callee. The callee may be represented by multiple endpoints in case of more complex media service scenarios, e.g. when session forking is used (see FIG. 1).

The end of a signaling session may be for example detected in the signaling plane probe by detecting a signaling protocol specific hang-up message, a terminal failure to connect the involved endpoints or a session timeout. Each correlation key (e.g. hash key) is then generated by the signaling plane probe based on a timestamp indicative of the point in time at which the end of the respective signaling session has been detected by the signaling plane probe and using information on respective direction of the media plane data flow (e.g. caller-to-callee or callee-to-caller for a simple bi-directional service, e.g. VoIP call).

The direction may be for example given by a media data path of a media stream of the respective service. A media data path could be for example indicated by a tuple comprising the destination IP address and UDP port number for transmitting the media packets of a media stream of the service. The signaling plane probe may thereby generate only one single correlation key per direction or multiple correlation keys per direction. In one exemplary embodiment of the invention, the signaling plane probe generates one correlation key per direction, where the correlation key for a respective direction is based on a media data path of a media stream. This media stream of which the media data path information is used to generate the correlation key should be existent at the end of the signaling session (according to the session signaling monitored by the signaling plane probe), in order to be able to match the correlation key to a corresponding correlation key in a media stream report generated by a media plane probe. The media data path(s) of a service and optionally their existence (e.g. start time and termination time) could be for example learned by the signaling plane probe from the messages of the signaling session of the service.

The correlation keys generated for the different directions of the service corresponding to the signaling session the end of which has been detected are then comprised in a signaling session report, which may be for example stored in a database or (flat) file.

Alternatively, the signaling plane probe may also generate a correlation key for each media stream in the media plane of the service. In this case it may be assumed that the signaling plane traffic, i.e. the packets of the signaling protocol of the signaling plane, allow the signaling plane probe to detect the termination (i.e. end) of respective media streams in the media plane. In this case, the detection of the end of a media stream could trigger the generation of a correlation key for the respective media stream based on information on its media data path and a timestamp indicating the point in time at which the signaling plane probe detected the termination of the media stream.

Further, in another alternative implementation, the detection of the end of a signaling session, respectively, service as well as the end of a media stream as detected by a signaling plane probe could be used to trigger the generation of correlation keys in the signaling plane probe. For example, during the ongoing service the detection of the termination of a media stream in the media plane as learned from the signaling plane traffic could trigger the signaling plane probe to generate and include respective correlation keys for the media streams terminated during the ongoing session into the signaling session report of the service, while the detection of the end of the signaling session, and thus the service, could be used as a trigger for generating correlation keys for the respective media streams being "alive" in the media plane of the service at the signaling plane probe and their inclusion into the signaling session report of the service.

In the media plane, the media plane probe generates a correlation key (e.g. hash key) for each media stream. The correlation keys for the media steams are generated upon the media plane probe detecting the end of the respective media stream. The correlation key for a respective terminated media stream is calculated by the media plane probe based on the direction of the respective media stream, e.g. based on the media data path of a media stream, and on a timestamp indicative of the point in time at which the respective media stream ended. This point in time is for example the point in time at which the last packet of the media stream has been received at the media plane probe. In this latter case, the media plane probe may thus maintain a timestamp indicating the time of reception of the last packet of the media stream at the media plane probe.

The timestamp used for the generation of the correlation key may indicate another point in time than the point in time at which the media plane probe detects the end of the media stream. For example, in a packet switched network, there may be interruption in the packet stream of the media stream so that there may be a timer that measures the time since the last reception of a packet of the media stream. In case the time since the last reception of a packet of the media stream is exceeding a threshold (e.g. the timer "expires")—for example after 15 or 30 seconds, or the like—then the media plane probe detects the end of the media stream. The timestamp used in the correlation key generation may nevertheless be the point in time at which the last packet of the media stream has been received. The media plane probe stores the correlation key (e.g. hash key) for the media stream in a media stream report, which may be for example stored in a database or exported as a flat file.

Furthermore the timestamp used for the generation of a correlation key may be rounded. This counters differences in the time basis (local time) of multiple signaling and media probes as slightly different timestamps still yield the same rounded timestamp. Additional correlation keys may be generated with different timestamps, e.g. indicative of the—optionally rounded—end of a respective signaling session and/or media stream or a timeframe before or thereafter. These additional correlation keys may be stored in the respective signaling session reports and/or media session reports.

A media stream may also be interrupted due to codec features such as Voice Activity Detection (VAD). If a sender of a media stream is mute the codec may not encode any data resulting in an interruption of the media stream. This is typically indicated in the packet stream transporting the media and should not be considered by the media plane probe as an indication of the end of the media stream itself. In case a timer mechanism is used to detect terminated media streams, the timer should be configured such that codec features that lead to a temporary interruption of the media stream are not triggering the termination of the media stream (according to the detection mechanism for detecting terminated media streams in the media plane probe).

Furthermore, in another exemplary embodiment, the correlation of media streams of services and the signaling sessions of the services may also be based on a compound keys used as a correlation keys. This exemplary alternative implementation may however require a more complex database structure of the media stream reports and signaling session reports, as will be outlined below.

Another further aspect of the invention is the use of the correlation keys comprised in the signaling session reports and the media stream reports to identify the media streams and signaling session belonging to the respective services. This correlation of media streams and signaling session could be done for example periodically or on request. The correlation keys generated by the signaling plane probe and the media plane probe should be matching each other (i.e. the correlation keys of a given signaling session report should be found in the media stream reports, respectively, the correlation key of a media stream report should be found in one of the signaling session reports). Hence, a correlation unit can identify which media streams belong to which signaling session (or vice versa) based on the correlation keys contained in the media stream reports and the signaling session reports and may therefore generate a service record for a respective service based on information contained in the media stream reports and information contained in the signaling session report of the service.

The correlation methods according to the different embodiments of the invention proposed herein are based on a probe monitoring the signaling plane traffic of services (i.e. the signaling plane probe) identifying new services and associated media data paths of the media plane by detecting their corresponding signaling sessions and determining for each service correlation keys allowing to identify at least the media streams of the media plane existent upon termination of the service. It should be noted that "at least the media streams" means that it is optionally possible to generate a correlation key for each media data path of the media plane learned from the signaling plane traffic of the service, in case it is possible to detect the termination of the media data paths of the media plane in the signaling plane traffic. In this case the correlation key for a respective media stream may be based on the information on the media data path of the respective media stream visible in the signaling plane of the service and the point in time at which the signaling plane probe detects the termination of the media stream in the signaling plane.

Regarding the use of the point in time of the termination of the signaling session (e.g. a signaling message in the signaling plane indicating "hang up") for the generation of correlation keys it should be noted that the termination of the signaling session also means that all existent media data paths, respectively, the corresponding media streams of the media plane are terminated. Hence, in case it is not possible to detect the termination of the media data paths of the media plane in the signaling plane traffic, it is assumed to be possible to detect at least the end of the signaling session and to thereby conclude on the termination of the respective media data paths of the media plane and to thereby facilitate correlation of the media streams that have been "alive" at the end of the service and the corresponding signaling session of the service.

As noted above, another possibility may be to use compound keys as correlation keys. A compound key is defining a set of information comprised e.g. in a given set of fields of a database entry of a signaling session report and media stream report—together with additional criteria on the point in time of the termination of a media stream or the service—allows to correlate media streams and signaling sessions of the services. In one exemplary embodiment, the one or more databases that are used to store the signaling session reports and the media stream reports are partitioned into partitions covering only a given amount of time (i.e. time interval) of signaling session reports and/or media stream reports, respectively. The "size", i.e. the time interval covered by the partitions may be for example determined based on the average time interval in which port reuse occurs in the target monitored packet-switched network (e.g. the partition could cover ½ of the average time interval in which port reuse occurs). In the given partitions it may thus be assumed that the media data path information, such as destination IP address and UDP port number are unique. In this case, the signaling session reports and media stream reports may not include separate correlation keys, but the correlation key can be generated on-demand as a compound key from the information on the media data paths contained in the signaling session reports and media stream reports.

Hence, it would be sufficient that the signaling session reports and media stream reports store information on the media data paths of the service (e.g. destination IP address and UDP port number) and a timestamp that indicates the point in time of termination of the respective media data path in the media plane, as detected by the signaling plane probe from the monitored signaling sessions and the media plane probe from the monitored media streams. As noted above, the signaling plane probe can also detect the point in time of termination of the media data path(s) in the media plane by detecting the point in time of termination of the signaling session, which is—in most practical cases—coinciding with the termination of all media streams of the service in the media plane as well.

In this case, the correlation could be realized by first selecting the database partition of the media plane reports according to a timestamp of the termination of a media data path/signaling session within a given signaling session report, and by then determining the media stream reports that comprise media stream information matching those indicated in the given signaling session report.

Figure 4:
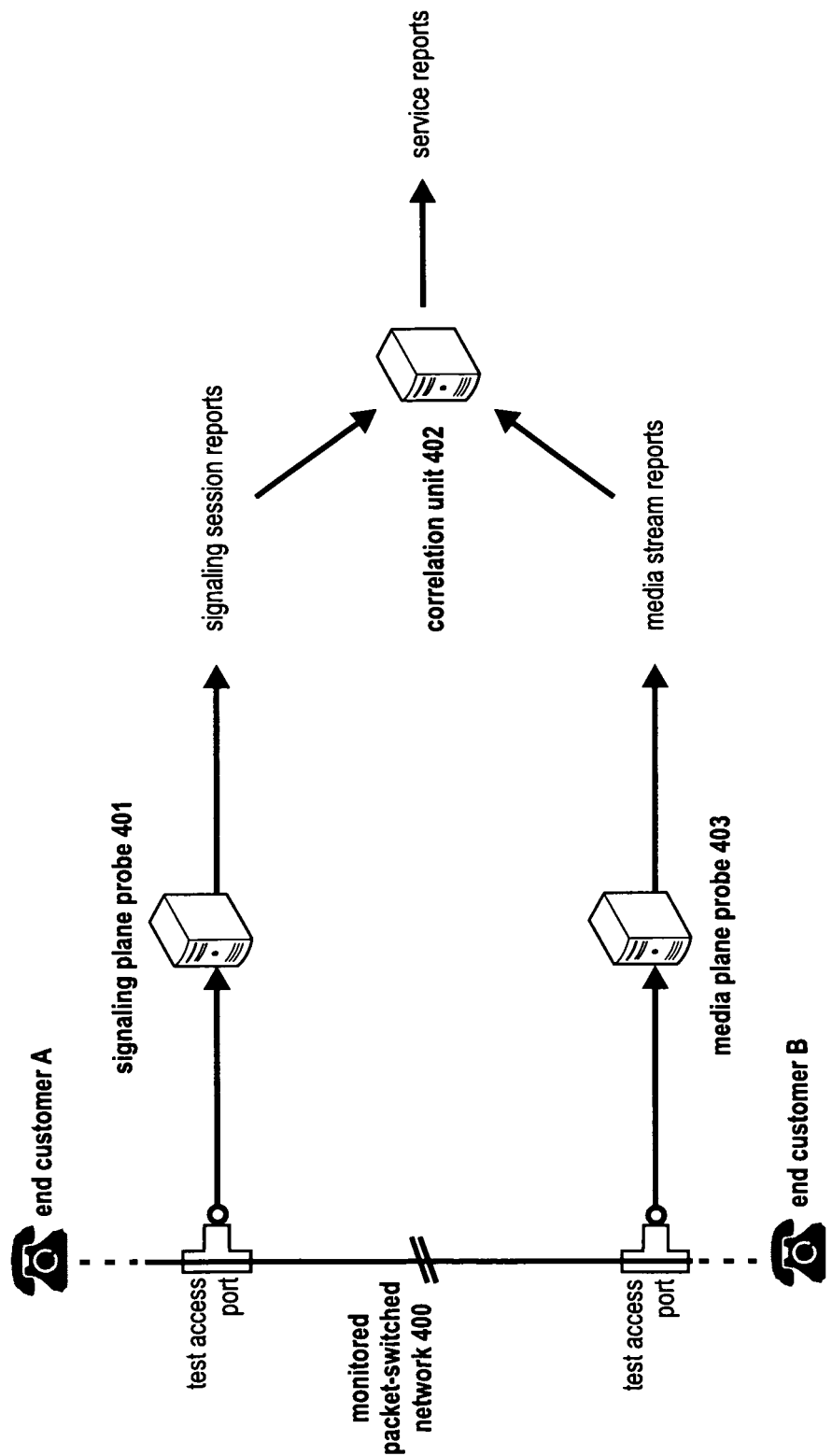
FIG. 4 shows an exemplary overview on a system according to an embodiment of the invention comprising signaling plane probe, a correlation unit and a media plane probe in a packet-switched network.

FIG. 4 shows a packet switched network 400 according to an exemplary embodiment of the invention that comprises a signaling plane probe 401, a correlation unit 402 and a media plane probe 403. Please note that more than one signaling plane probe 401 and media plane probe 403 may be provided. Optionally, there may be multiple correlation units 402 present, working independent of each other and not impacting the performance or correlation accuracy of any other component.

The signaling monitoring probe 401 and the media plane probe 402 are monitoring the traffic on a packet-switched network 400, which may be for example an IP based packet switched network. It is assumed for exemplary purposes that the signaling plane probe 401 and the media plane probe 403 monitor the traffic of the packet-switched network 400 at different locations of the packet-switched network 400, but observe the same network traffic.

In one exemplary implementation, the signaling plane probe 401 and the media plane probe 403 are probes of a minimal non-intrusive, passive monitoring system. The respective monitoring probes 401, 403 are connected to the packet-switched network 400 via respective test access ports (TAPs). A TAP is a passive network device that mirrors network traffic of the packet-switched network without interference of the original network traffic. It provides a copy of every packet sent or received on the network, by duplicating the data packets observed on the physical layer of the network. Instead of a TAP a Switch Port Analyzer (SPAN) port may be used to monitor the traffic of the packet-switched network.

In packet-switched environments, the signaling data of the signaling plane and media data of the media plane is packaged into packets on the transmitter side. Packets are transported over the packet-switched network independent of each other. The receiver of the packets—identified by the destination IP address and port—may have to regroup and sometimes reorder packets in order to compile streams from single packets.

On the signaling plane multiple packets belong to one signaling session. The first packet of a signaling session—usually containing a "call setup" message—starts a new signaling session (respectively a new service). At this point, the signaling plane probe 401 generates a session entry along with auxiliary data, i.e. a unique correlation key identifying the session internally (signaling session identifier). Packets following the initial signaling packet are matched to one of the currently ongoing signaling sessions (respectively services) and signaling sessions managed by the signaling plane probe. Packets which do not start a new signaling session and do not belong to existing sessions may be discarded.

Matching single signaling packets to existing signaling sessions is specified in the standards which define the signaling protocol itself. Transport layer information like IP addresses and protocol-specific information (e.g. SIP Call-IDs and tags) may be used.

A signaling session may be torn down upon reception of a special packet—a "call hang-up" message. This message again is specific to the signaling protocol used. Upon reception of this message the signaling plane probe 401 can conclude on the termination (end) of the signaling session and generates the correlation keys for use in correlation of media plane and signaling plane of the services. Furthermore, the signaling session may be removed from its internal storage. Additionally the signaling monitoring component may remove sessions from its internal storage, if it identifies stale sessions.

The media plane 403 of the service may for example identify the media plane data in form of RTP streams. RTP streams are—analog to the signaling sessions—made up from individual RTP packets. The transmitter of an RTP stream generates RTP packets by splitting the media data into smaller pieces. In general these packets are relatively small to reduce the delay between sender and receiver. As a result many packets are created and form a single RTP stream—typically 50 packets per second. Single RTP packets can be grouped into an RTP stream by media plane probe 403. When using RTP, the media plane probe 403 has transport layer information as well as the RTP protocol header which contains a so called Synchronization source (SSRC). The SSRC is a 32-bit numeric identifier which is contained in every single packet and deemed mandatory by the RTP. When media plane probe 403 first receives a packet which does not match an existing RTP stream in its internal storage it creates an RTP stream. Consecutive RTP packets can then be matched to the existing streams by comparing the transport layer information and SSRC value. If no packets are received for a single RTP stream for a certain time the stream is considered ended and can be removed from the internal storage. A short interruption in the packet stream should not trigger the media plane probe 403 to mark an RTP stream as ended, thus the time before a media plane probe 403 can consider an RTP stream as ended is multiple seconds and has to take features like voice activity detection into account.

The signaling plane probe 401 and the media plane probe 403 generate information about the signaling session and media streams, respectively. This generated information is comprised in signaling session reports and media stream reports, respectively. In order to track running sessions and media streams the entities 401, 403 store information internally while the signaling sessions and media streams are in progress. When a signaling session or media stream is terminated the respective monitoring component 401, 403 may generate a signaling session report with signaling information, respectively media stream report with information on the media stream. As will be outlined below in further detail, the signaling session report provides a summary of the signaling session (service) and includes the correlation keys (e.g. hash keys) for correlation. Similarly, the media stream reports summarize the media stream and also include a respective correlation key (e.g. hash key) to facilitate correlation.

Each signaling session report for a signaling session may be for example written by the signaling plane probe 401 upon completion of a signaling session and contains data which describes the signaling session it monitored. For example, in one embodiment of the invention, the data stored in the signaling session report and describing the signaling session include—but are not limited to—a set of caller and callee specific properties which will be available per endpoint (caller or callee). These endpoint-specific properties may for example include at least one of the following:
 endpoint address/name (e.g. SIP URI),
 phone number,
 User-Agent (endpoint software and version),
 capabilities/features,
 supported media types,
 IP addresses and ports for signaling and media streams (from SDP body), and
 hash key of the media path (for example described by the destination IP address and UDP port of the expected media stream)
 signaling routing information.

Additionally, one or more of the following signaling session properties which are not endpoint-specific may also be included in the signaling plane report:
 timestamps: e.g. session start, Post-Dial-Delay (PDD), connect time, session end;
 information on the session flow (e.g. signaling message(s) with timestamps),
 session state (e.g. successful, unsuccessful, timed out, reason for failure), and
 events during session (media on hold, codec renegotiation, session forking, authentication)

In one exemplary embodiment of the invention, the signaling session report comprises all of the above noted endpoint-specific properties, and—optionally—all signaling session properties listed above, as far as they are available from the signaling protocol messages.

Depending on the specific implementation and capabilities of the signaling plane probe, the signaling session reports may contain information about multiple endpoints and/or multiple media streams per endpoint. In this case the session end timestamp may be available per involved endpoint, and not per session.

For example, the most trivial VoIP service is a phone call between two parties (including two media streams, one in each direction). In this case, the signaling session report could store each party as one endpoint with the above mentioned information and the media stream's destination IP address and port information. If the VoIP service would contain a video call (i.e. one audio and video stream per direction) the endpoint information may be extended to contain the destination IP address(es) and port numbers of the two media streams per direction (one IP address & port tuple for audio, one IP address & port tuple pair for video). Considering a VoIP service, the respective tuples of destination IP address and UDP port number of the media streams of the session may be for example learned by the signaling plane probe from the SDP body of SIP signaling.

Likewise, the signaling plane probe may extend the signaling session report to include additional endpoints, if multiple endpoints were part of the VoIP service. Multiple endpoints could be for example involved in a VoIP service, in case a caller tries to reach a callee which has call forwarding configured. The caller may then hear a ring-tone from the callee's landline, followed by a ring-tone from the callee's mobile phone. Finally a voicemail box picks up the session generating a third endpoint on the callee's side.

The media plane probe 403 monitors the media traffic, i.e. the individual media streams that convey the media information of the different services. The media plane probe 403 identifies a new media stream of a media service based on the network traffic it observes on the monitored packet switched network 400. The identification of a new media stream for a given service may happen shortly after this service is set up on the signaling plane. Throughout the duration of the media stream information on the media stream may be stored in an internal data record on the media steam. The media plane probe 403 may note for each stream the last RTP packet received for the respective media stream in an internal data record on the media stream in order to allow detecting the media stream's termination.

The media plane probe 403 may optionally perform a real-time analysis of the media streams monitored on the packet switched network and may generate a fine-grained media stream quality report with media stream related information. Fine-grained media stream quality reports could be for example written in predetermined time intervals, e.g. every five seconds, and could provide a summary of the media stream in the respective interval as well as quality information of the media stream in the respective interval. The information of the fine-grained media stream quality reports of a media stream could be used by the media plane probe 403 to generate a single media stream report on the media stream upon the end of the media stream is detected by the media plane probe 403. The media stream report and optionally also the fine-grained media stream quality reports of a media stream may be stored in individual databases.

The media stream report generated by the media plane probe 403 upon detecting the end of the media stream may contain data which describes the unidirectional media stream it monitored as well as correlation key that can be for example generated based on the destination IP address and UDP port number of the media stream and a timestamp that indicates the point in time at which the media stream ended/terminated. The media plane probe 403 could for example learn the destination IP address and UDP port number from the IP header encapsulating the RTP packets on the network layer. The characteristics of each media stream can be grouped into two categories. The transport and RTP header information characterize the media stream, e.g. for correlation purposes, whereas the quality information enable quality related processing of the media stream. In general the transport information is the same for all media packets processed as part of a single media stream. The stream quality information includes information covering all media packets and may be aggregated or stored on a per-packet basis.

In one exemplary embodiment of the invention, the media stream report generated by the media plane probe 403 for a given media stream may for example include one or more of the following transport media information:

source and destination IP address,
source and destination UDP port,
RTP header Synchronization source (SSRC) value,
RTP payload type, and
correlation key(s) (e.g. hash value(s)) calculated based on destination IP address, destination UDP port and a timestamp indicating the point in time at which the of the media stream terminated (e.g. the timestamp of the last packet received for the media stream) or timestamp indicative of the timeframe before or after the termination timestamp.

The stream quality information that may be added to the media stream report by the media plane probe 403 may for example include/indicate one or more of the following:

timestamp information (e.g. start and/or end time),
RTP format violations,
protocol conformance (e.g. sequence errors and/or DSCP errors),
transport information (e.g. packet interval and jitter statistics, information on packet loss, information on duplicate packets, etc.), and
MOS values (e.g. per time-slice (e.g. every 5 seconds), minimum/average/maximum value for entire stream duration, etc.),
events (e.g. comfort noise, silence suppression, DTMF tones, codec changes, marker bits).

In one exemplary embodiment of the invention, the media stream report comprises all of the above noted transport media information and optionally further all stream quality information listed above, as far as they are available to the media plane probe from the packets of the media streams.

In addition to "measured values" (e.g. jitter between multiple media packets) the media stream report may also contain calculated information like MOS (Mean Opinion Score) values and information about impairments experienced by the receiver of the stream.

As further shown in FIG. 4, a correlation unit 402 correlates the media stream reports and signaling session reports generated by the signaling plane probe 401 and the media plane probe 403 in order to identify the media streams and the signaling session that belong to a respective service. It should be noted that each service is assumed to have one signaling session, but may have one or more media streams.

Generation of Correlation Key

The correlation key that is used for correlation may be built from:

the timestamp that indicates the end of the signaling session, respectively the end of a given media stream, and
information on a media stream, such as for example the destination IP address and UDP port of the media stream.

The correlation of signaling plane and media plane by the correlation unit 402 is based on this compound correlation key.

As noted earlier, the correlation key may be for example a hash key generated based on the before-mentioned parameters. The hash function to calculate the hash key (sometimes also called hash value) from the given data should be known to all parties involved (i.e. signaling plane probe 401, and media plane probe 403 and optionally also correlation unit 402) so that the result for a given input is the same for all parties. Therefore, the hash keys are determined by the signaling plane probe 401 and media plane probe 403 using media data path information in addition to a timestamp that indicates point in time when the signaling session, respectively, the media stream ended/terminated. The correlation unit 402 may generate additional correlation keys based on the timestamps indicative of the timeframe before or after the timestamp that indicates the point in time when the respective session ended.

The hash function to determine the hash key may be a simple concatenation of one or more of the input parameters. For example, a concatenation of a destination IP address, destination UDP port number and a timestamp may (optionally including a delimiter character in between the parameters) be used for defining the hash keys. Of course more complex mechanisms may also be used to calculate a hash key representing the signaling session identifiers and/or the media path identifiers. For example the MD5 message digest function (see IETF RFC 1321, "The MD5 Message-Digest Algorithm", 1992, available at http://www.ietf.org) could be used to create a valid hash key. The MD5 message digest function may be fed with a concatenation of a destination IP address, destination UDP port number and the timestamp indicating the time of termination of the signaling session, respectively, the media stream and the resulting string can be used as a correlation key. Another hash function that could be used may be selected from the SHA cryptographic hash function family (see FIPS PUB-180, "Secure Hash Standard (SHS)", 2008 available at http://www.itl.nist.gov/fipspubs/). Furthermore, in another embodiment, a linear hash function may be used.

As outlined with respect to FIG. 1 earlier herein, ephemeral media streams may exist at any point during a service, such as a VoIP service. The ephemeral media streams may be generated by early media streams, service forking and codec changes. As a result the start and end timestamps of media streams may not necessarily concur with the start and end time of the VoIP service itself. Yet the timestamps of the start or end of a signaling session or media stream are an important piece of information for a successful correlation, as it significantly reduces the search window and amount of data to search. In typical scenarios, it can be expected that the start time of signaling and media streams deviate significantly and are thus not ideal candidates for a correlation mechanism.

At the end of a VoIP service both caller and callee have an established signaling session and send each other media on the media plane. Once a party hangs up the session a hang-up signal is send on the signaling plane and at the same time stops sending media packets. Once the remote party receives the hang-up signal it also stops transmitting media. The timestamps of the end of the signaling session of a service and the end of the corresponding media streams in the media plane of the service are commonly very close to each other compared to the start of a media service in signaling plane and media plane. All these events will be subject to the same network- and application-imposed delays. Still the time-frame in which these happen is typically in the few milliseconds range or in the sub-second-range on long-distance or low bandwidth networks. This makes the timestamps of the end of the signaling session and the end of the media streams a good choice for calculating a correlation key.

Nevertheless, since signaling plane probe 401 and media plane probe 403 independently determine the correlation keys based on timestamps (and even minor deviations of the timestamps in the millisecond-range could lead non-matching correlation keys), the granularity of the timestamps used for the generation of the correlation keys may be chosen to account for those deviations of events in signaling plane and media plane events (i.e. deviations in the end of the signaling session in the signaling plane and the end of the corresponding media streams in the media plane of a service). Therefore the timestamps could have a granularity for example in the range of one or more seconds or at least 250 milliseconds or 500 milliseconds. In one exemplary embodiment, UNIX timestamps (which is indicating the seconds passed since Jan. 1, 1970, 00:00:00) are used for the calculation of the correlation keys. Alternatively, also timestamps with a high resolution (e.g. resolution of one or ten or hundred milliseconds) could be used, but the timestamps may be rounded for the calculation of the correlation keys. It should be noted that the choice of the granularity or rounding interval may also impact the performance of a database or databases storing the media stream reports and signaling session reports for correlation. The larger the granularity, respectively the rounding interval and thus the search window the more data have to be processed to match signaling sessions and media streams.

Rounding timestamps could be for example implemented by rounding the timestamp to the nearest n second interval. Assuming for example that the interval is 5 seconds the following UNIX timestamps would be rounded as exemplified in Table 1.

TABLE 1

| Unix timestamp value | rounded value (5 sec) | description |
|---|---|---|
| 1283936131 | 1283936130 | rounded down |
| 1283936133 | 1283936135 | rounded up |
| 1283936135 | 1283936135 | unchanged |
| 1283936136 | 1283936135 | rounded down |
| 1283936139 | 1283936140 | rounded up |

The rounding interval can be any time interval in seconds or even milliseconds whereas the specific value is a trade-off between speed and accuracy. As noted above, the larger the interval the more data may have to be processed to match signaling sessions and media streams. The smaller the search window is the more likely it is to miss a match due to misaligned timestamps or derivations due to the delays outlined above.

The best rounding interval depends on the network monitored. Reasons for increased time differences are possible derivations from a shared time source (NTP) or differences seen in signaling and media events, i.e. the delay between a call being terminated and the endpoints stopping to send media.

For a smaller search window of three seconds the rounded values are different, as for example shown in Table 2.

TABLE 2

| Unix timestamp value | rounded value (3 sec) | description |
|---|---|---|
| 1283936131 | 1283936130 | rounded down |
| 1283936133 | 1283936133 | unchanged |
| 1283936135 | 1283936136 | rounded up |
| 1283936136 | 1283936136 | unchanged |
| 1283936139 | 1283936139 | unchanged |

Using normalized "session end" timestamp (i.e. timestamps of low granularity or timestamps that have been rounded) may be advantageous to counter the effects (e.g. false positive hash key matches) of the re-used port numbers. Since the end of a service (and/or end of media streams) becomes part of the correlation criteria only the port numbers that are used and valid at this point in time are considered in the correlation.

Another issue that could complicate the correlation processing is that deviations in detecting the end of a media stream, respectively a signaling session at the media plane probe 403 and the signaling plane probe 401 leads to the two entities rounding the timestamps to different values. For example, the signaling plane probe 401 could round the timestamp up, while the media plane probe 403 rounds the timestamp down to the next rounding interval value due to (minor) deviations in the timestamps at the signaling plane probe 401 and media plane probe 403. In another exemplary embodiment, additional correlation keys may be therefore generated by either one or both, the signaling plane probe 401 and media plane probe 403.

The signaling plane probe 401 and/or media plane probe 403 may use timestamps indicative of the rounding intervals before or after the timestamp indicative of the point in time where a particular signaling session or media steam ended. For example a session ended at a point in time identified by the Unix timestamp value 1283936135. The correlation unit applies the rounding mechanism based on 3 second intervals. The rounded value thus is 1283936136. The correlation unit may generate additional keys with the timeframes before or after the mentioned rounded value. In this case the timestamps used for generation of the additional keys are 1283936133 (1283936136−3 seconds) and 1283936139 (1283936136+3 seconds). Of course, especially in cases where the rounding interval is short, it may also be desirable to more rounded timestamps rounded to the next and subsequent rounding interval(s) based on which correlation keys are calculated.

Figure 13:
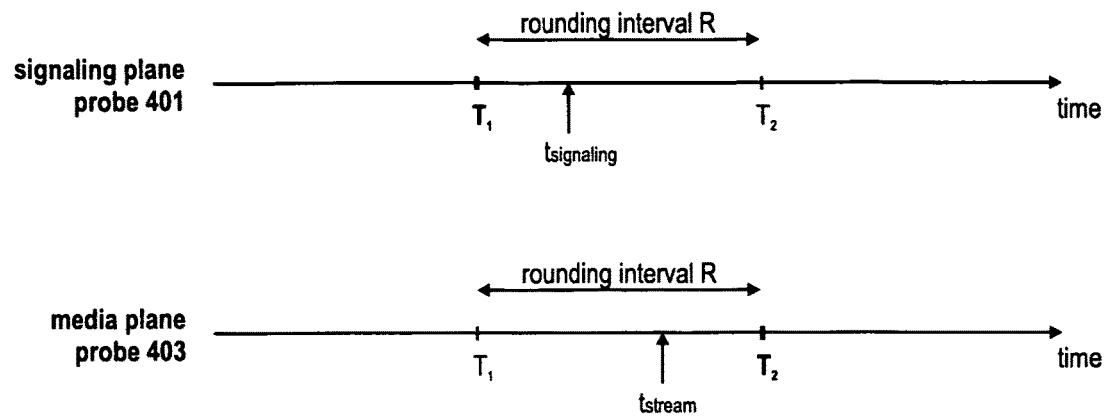
FIG. 13 illustrates the use of rounded timestamps within a signaling plane probe and a media plane probe to highlight potential sources of error in correlation.

As noted above, the inclusion of multiple correlation keys calculated based on different timestamps for a given direction of a signaling session and/or media stream may for example be useful to counter correlation failures due to applying different rounding of timestamps in the signaling plane probe 401 and media plane probe 403 as will be outlined in further detail based on FIG. 13 and FIG. 14 in the following. The end of the signaling session $t_{signaling}$ of a service as observed by the signaling plane probe 401 and the end of the one or more media streams $t_{stream}$ of the service as observed in the media plane probe 403 may not perfectly match each other as shown in FIG. 13. Even in case signaling plane probe 401 and media plane probe 403 calculate correlation keys based on the same IP address and UDP port tuple, the use of different timestamps $t_{signaling}$ and $t_{stream}$ for the calculation of the correlation key will result in the correlation keys generated by signaling plane probe 401 and media plane probe 403 not matching each other. Additionally the use of rounded timestamps may not necessarily resolve this problem, as it cannot always be assured that the timestamps $t_{signaling}$ and $t_{stream}$ are rounded to the same value. As also highlighted in FIG. 13 it could well happen that signaling plane probe 401 rounds the timestamp $t_{signaling}$ to the next lower rounded value $T_1$ in accordance with the rounding interval R, while the media plane probe 403 rounds the timestamp $t_{stream}$ to the next higher rounded value $T_2$ in accordance with the rounding interval R. Again, correlation keys calculated on the different rounded timestamps $T_1$ and $T_2$ would not match each other.

As noted above, one possible solution to this problem is to include additional correlation keys at least to one of the signaling session reports and media stream reports. For example, in one exemplary embodiment, the media plane probe 403 could include two correlation keys per direction to the signaling session report. For a given media data path of a media stream (e.g. IP address and UDP port tuple) observed by the signaling plane probe, the signaling plane probe could calculate one correlation key $C_{stream,1}$ on the media data path information and a rounded timestamp $T_1$, i.e. using the timestamp indicative of the end of the signaling session $t_{signaling}$ rounded to the next lower value according to the rounding interval, and the signaling plane probe could further calculate one correlation key $C_{stream,2}$ on the media data path information and a rounded timestamp $T_2$, i.e. using the timestamp indicative of the end of the signaling session $t_{signaling}$ rounded to the next higher value according to the rounding interval. Both correlation keys could then be included for the direction/media data path to the signaling session report.

A further implementation may include even further correlation keys, e.g. a third correlation key that is based on the rounded timestamp $T_0$, indicative of the next lower timestamp to $T_1$ according to the rounding interval.

The media plane probe 403 may calculate only one correlation key $C_{stream}$ based on a rounded timestamp $T_1$ or $T_2$, i.e. based on the timestamp indicative of the end of the media stream (media data path) $t_{stream}$ rounded to the next lower or higher value according to the rounding interval (and rounding rules). This correlation key for the media stream would then be included to the media stream report.

The correlation of the signaling session to the media stream(s) of the service would be successful in this embodiment, since either the correlation key $C_{stream,1}$ or the correlation key $C_{stream,2}$ within the signaling session report for the given direction/media stream would correspond to the correlation key $C_{stream}$ included in the media stream's media stream report.

Optionally, in another embodiment of the invention, also the media plane probe 403 may calculate two or more correlation keys for each media stream, one correlation key based on the rounded timestamp $T_1$, i.e. based on the timestamp indicative of the end of the media stream (media data path) $t_{stream}$ rounded to the next lower value according to the rounding interval, and the other correlation key based on the rounded timestamp $T_2$, i.e. based on the timestamp indicative of the end of the media stream (media data path) $t_{stream}$ rounded to the next higher value according to the rounding interval. Both timestamps would then be included in the media stream report for the media stream by the media plane probe. In this exemplary implementation, the correlation may check whether the two correlation keys of the service's signaling session report for the direction/media stream match the two correlation keys within the media stream report of the service's media stream to confirm the signaling session report and media stream report belonging to the same service.

Please note that instead of or in addition to the media plane probe 403 including two or more correlation keys to the media stream reports, also the signaling plane probe 401 could calculate two or more correlation keys per direction/media data path that is to be indicated in the signaling session report. Including multiple correlation keys per direction/media data path in the signaling session reports may be advantageous as it reduces the overhead information, since there are commonly less signaling session reports than media stream reports generated in the passive monitoring system.

Furthermore, in another exemplary implementation, the database(s) for signaling session reports and media stream reports may be further partitioned to reduce the search space for correlation. For example, the (respective) database could be partitioned in chunks of multiple hours, e.g. 4 or 6 hours or the like. The signaling session reports and media stream reports may further include as a separate element the timestamps of the end of the signaling session, respectively, the end of the media streams, based on which the database(s) can be partitioned and based on which the correct partition could be chosen for correlation later. Hence, in a more advanced implementation, besides the correlation keys a service end timestamp can be used as a search criteria to limit the amount of data that are to be searched in a database significantly.

In another exemplary implementation, the signaling plane probe may also generate a respective correlation key for all media streams of a service, in case the end of media streams is detectable within the session signaling, as noted previously. In this case the signaling session reports could further include a timestamp that indicates the end of each media stream, in order to allow choosing the correct partition of media stream reports in the database for correlation.

Correlation Mechanisms

For correlation of the media streams and the signaling sessions, different possibilities exist how the correlation by the correlation unit can be implemented. For example, according to exemplary embodiments of the invention, the correlation unit may correlate the media streams and the signaling session of the respective services periodically (or proactive) or in response to a query (i.e. on demand).

For example, a proactive correlation process could be utilized by a third party entity which has access to both signaling session reports and media stream reports. Their data may be present in one or more databases to ease access to the raw data. As noted above, the correlation aims at correlating signaling and media information of the services and at merging them into combined service reports that may be then accessed by a third party, e.g. for evaluation of the services.

The proactive correlation process periodically takes all new signaling session reports which outline—but not fully describe—the media services, e.g. the monitored VoIP sessions. For each signaling session report the correlation process draws the calculated correlation keys from the signaling session report. There are at least two correlation keys in each signaling session report, at least one per direction. Additional correlation keys may optionally exist in the signaling session report, for instance if it describes a video call or a session with multiple endpoints. For each correlation key contained in a respective signaling session report the correlation process searches the media stream report database for the media streams with the same correlation key. If the correlation keys in the signaling session report are generated based on a timestamp indicating the end of the signaling session, every media stream of the service that existed at the end of the service in the media plane should have the same correlation key and will be in the result set of the search. If the correlation keys in the signaling session report also contain correlation keys for media streams that have been terminated during the ongoing service, the search may also further detect those media streams in the media stream report database based on the correlation key.

If a search returned two or more media stream reports, the correlation process encountered one of two scenarios. Either both media streams belong to the signaling session (i.e. service) or one of them was returned due to a correlation key collision. Both cases may be recovered by comparing the contents of the media stream report against the signaling session report. If a media stream in the result set starts before or ends after a signaling session, it was added to the result set due to a correlation key collision. Due to time information it cannot match the signaling session and is deleted from the result set by the correlation unit. If the media stream result set still contains multiple entries after the previous correlation key collision check, all remaining media streams (i.e. their media stream reports) belong to the media service (e.g. the VoIP session).

Figure 14:
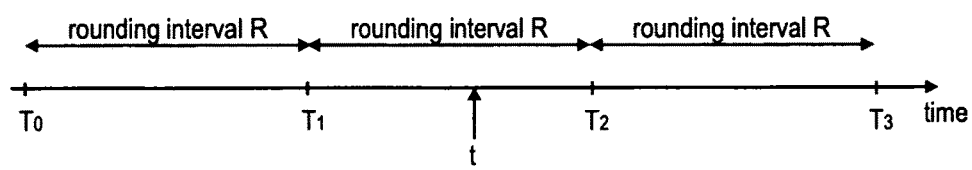
FIG. 14 illustrates the use of two rounded timestamps for generating respective correlation keys according to an exemplary embodiment of the invention.

If a search returned no usable entry, i.e. no signaling session reports and media stream reports comprising matching correlation keys have been found, the correlation unit may optionally use additional correlation keys contained in either the signaling session reports and/or media stream reports to run another search, as explained with respect to FIG. 13 and FIG. 14 above.

The correlation process may optionally select only the most significant media stream for each direction for inclusion to the service report on the media service. The parameters to define the significance of the media streams may be for example configurable by the user/administrator. One parameter for deciding the significance of a media stream in the result set could be the duration of a media stream. For example, the service report generated for a given media service by the correlation unit could include the media stream with the longest duration, in case multiple media stream reports match a correlation key of a signaling session report. Another option would be to include in the service report the last media stream that has been alive in the media service, in case multiple media stream reports match a correlation key of a signaling session report. The correlation process may optionally add information from multiple media streams to the service report, e.g. when the service consisted of an audio and video part.

For a given signaling session (i.e. service), the correlation process may run at least twice, one time for each correlation key in a signaling session report. For example, in case the media service is a VoIP service, the correlation process may be for example performed by the correlation unit once for the caller's media stream and once for the callee's media stream, both identified by their respective correlation keys in the signaling session report.

The correlation unit combines the information contained in the media stream reports that are correlated to a respective signaling session report and the information contained in the signaling session report to provide a service report, providing an outline of the service. The content of this combined service report may be for example the sum or a subset of information of the signaling and media stream reports of a given service. Furthermore, the content of the service reports for the respective services may be configurable and/or depending on the application.

In another exemplary embodiment of the invention, the correlation unit may perform the correlation based on the media stream reports as starting points which are matched to their corresponding signaling session report. Ideally, each media stream of a media stream report should match to one signaling session report based on its correlation key. This implementation may optimize the search time in the correlation processing. The above correlation mechanism starting from the signaling session reports searches the rather large media stream report database at least twice for each signaling session. If the correlation process is based on the correlation keys within the media stream reports entries as starting point, the correlation would periodically take all new media stream reports, obtain the correlation keys thereof and search the signaling session reports for matching signaling sessions. At this point the same steps are taken as outlined above.

Another option may be to correlate media stream reports and signaling session reports on demand. An on-demand correlation employs the same mechanism as the proactive correlation mechanism described above, but instead of running periodically, e.g. when introducing new signaling session reports or media stream reports into the database(s), the on-demand correlation process runs when a user requests particular data.

In an exemplary implementation, the database may contain independent sets of signaling session reports and media stream reports. An operator could request service reports of services linked to some given search criteria, e.g. a specific user, a specific source and/destination IP address, a certain service type, services using a particular software application, codec, etc. The user could be for example specified by providing a username, phone number, the user's SIP URI, etc. or another identifier of the user that can be found in a signaling session report. The correlation unit would then search for the signaling session reports for all signaling sessions matching the particular search criteria. The search criteria may be for example provided to the correlation unit through a web application running on a browser.

For each signaling session report matching the search criteria, the correlation unit subsequently searches for the matching media stream reports as described above for the proactive correlation process. The input for this on-demand correlation is a set of signaling session reports matching the search criteria and not all signaling session reports as in the proactive correlation procedure described above. The on-demand correlation process generates for each signaling session report matching the search criteria a service report, for example by enriching the information of the signaling session report with the matching media stream report information and returns the service report for each matching signaling session report. The returned data may be for example viewed by the web application as individual service reports. Optionally the on-demand correlation process may also store the generated service reports in a database. This would save the on-demand correlation processing time in case an operator requests the same information multiple times.

Correlation Unit

Figure 5:
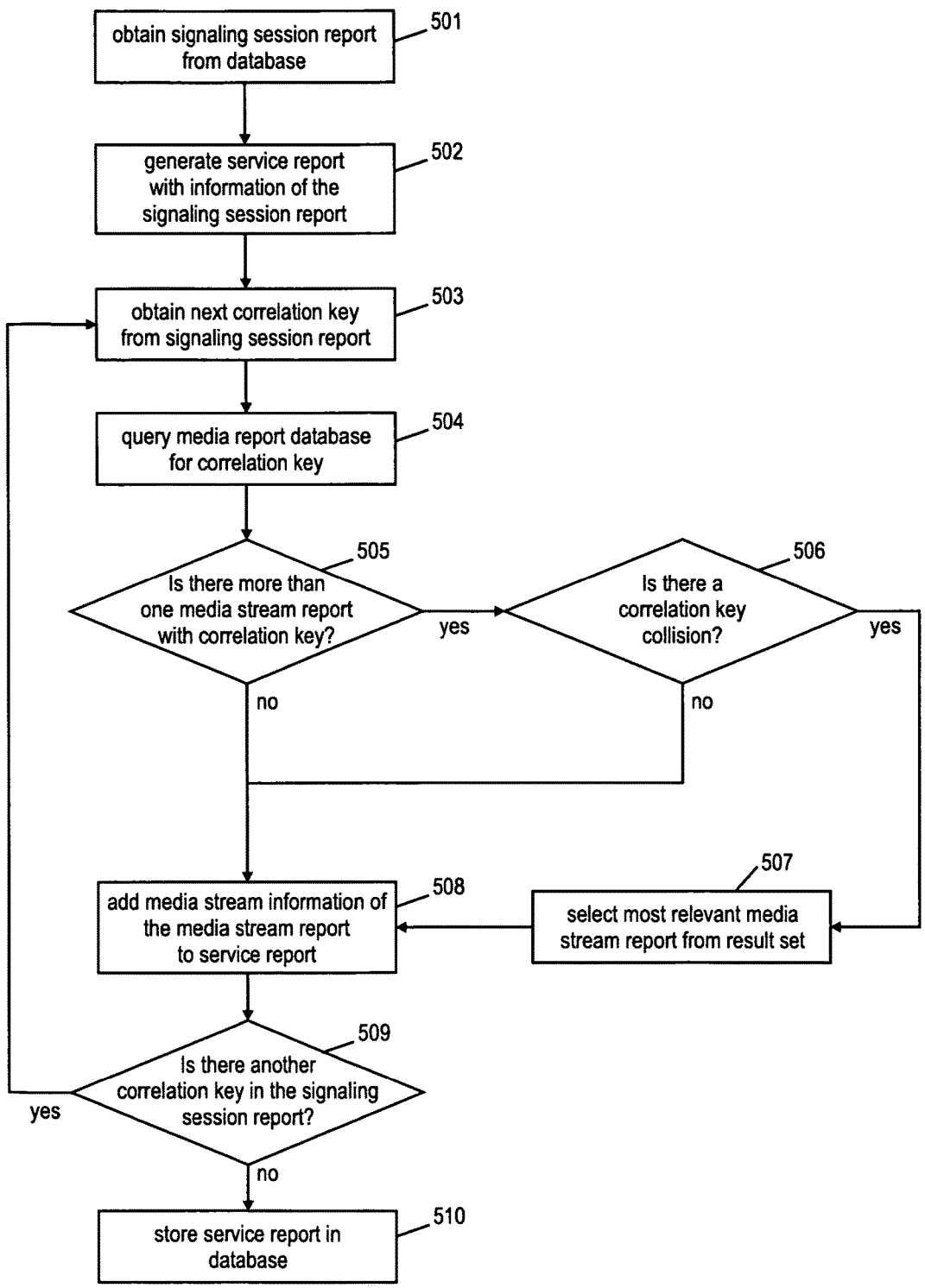
FIG. 5 shows a flow chart of the operation of the correlation unit according to an exemplary embodiment of the invention.
Figure 6:
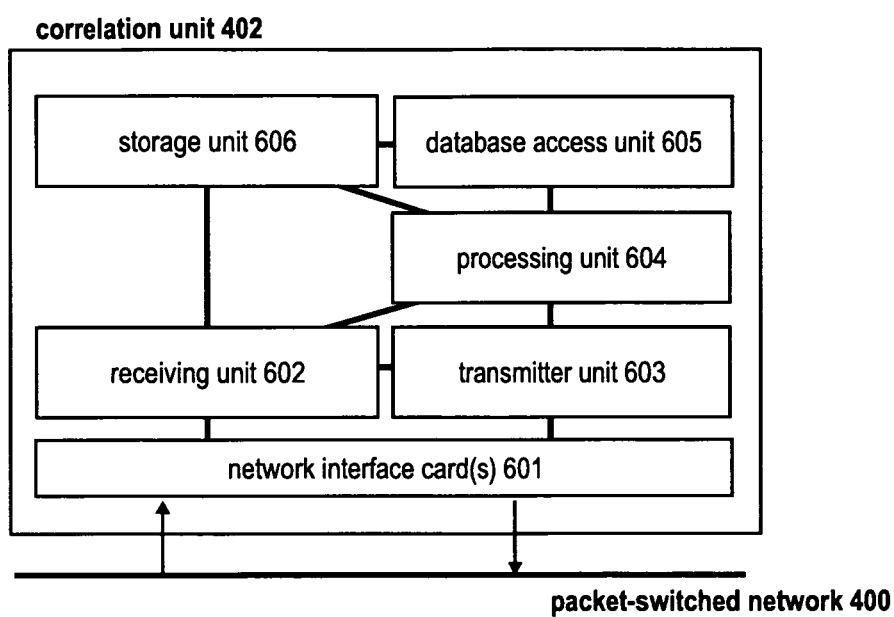
FIG. 6 shows the structure of a correlation unit according to an exemplary embodiment of the invention.

Next, the correlation unit 402 as shown in FIG. 4 is discussed in further detail with respect to FIG. 5 and FIG. 6. FIG. 6 shows the structure of a correlation unit 402 according to an exemplary embodiment of the invention.

The correlation unit 402 may be reachable via the packet-switched network, e.g. through a web based application. For this purpose, the correlation unit 402 may comprise one or more network interface cards 601. The correlation unit 402 has a receiving unit 602 and a transmitter unit 603, for example for receiving correlation related messages, such as for example on-demand correlation requests, and for responding thereto. Furthermore, the receiving unit 602 and a transmitter unit 603 may transmit and receive messages for accessing remote database(s) that contain(s) the signaling session reports and the media stream reports. The receiving unit 602 and transmitter unit 603 may receive and transmit the correlation related messages from its network interface card(s) 601.

The correlation unit 402 may also have a processing unit 604. The processing unit 604 may be used to determine correlation respective signaling sessions to their corresponding media streams. Furthermore, the processing unit 604 may be used to generate services reports. The service reports may for example comprise information on the respective services and the quality information of the media streams of the respective services. This information may be obtained from the signaling session report and media stream reports belonging to a given service. For correlation, it may be necessary to query one or more databases that comprise the signaling session reports and the media stream reports as provided by one or more signaling plane probes 401 and media plane probes 403. The correlation unit 402 may therefore comprise a database access unit 605 which provides functionality to access these one or more databases. In one exemplary implementation, the database(s) may be located remote from the correlation unit 403.

The correlation unit 402 may also have a storage unit 606, e.g. a RAM, for (temporarily) storing information and data related to the correlation processing. For example, the result set of media stream reports for correlation process, the data of the signaling session reports, and the service report generated for a respective service may be stored in the storage unit 606.

FIG. 5 shows a flow chart of the operation of the correlation unit 402 according to an exemplary embodiment of the invention. Exemplarily, the correlation processing for determining the media streams belonging to one given signaling session report is illustrated in FIG. 5. In case a correlation should be performed for more than one signaling session (report), the procedure of FIG. 5 is repeated for each signaling session report. For example, when using a proactive correlation mechanism, the correlation unit 402 could obtain all signaling session reports that have been generated since the previous correlation process from a signaling session database and process each of the signaling session reports according to FIG. 5. In another embodiment related to an on-demand correlation process, the correlation unit 402 could also receive a correlation request that is indicating one or more search criteria, and may first—not shown in FIG. 5—query a signaling session database for all signaling session reports that match the search criteria. The signaling session reports matching the search one or more criteria may then be each processed according to FIG. 5 and the service repots) are returned to the querying party.

The correlation unit 402 obtains 501 a signaling session report to be processed and generates 502 a service report for the service corresponding to the given signaling session. This service report may include information contained in the signaling session report and will be further supplemented with additional information as described below. Furthermore, the correlation unit 402 obtains 503 a correlation key contained in the signaling session report—as noted previously there should be at least two correlation keys contained in the signaling session report. Using the obtained correlation key, the correlation unit 402 queries 504 a media report database to receive all media stream reports that match the correlation key i.e. that contain the same correlation key.

As noted above, it may happen that the query results in the database returning more than one media stream report for the given correlation key, for example due to a hash collision of the correlation key. Therefore, the correlation unit 402 checks 505 whether the returned result set of the database query comprises more than one media stream report. If not (no), the correlation unit 402 can immediately enrich 508 the service report with information on the media stream as contained in the one media stream report returned from the media stream database.

In case the result set returned by the database comprises multiple media stream reports, the correlation unit 402 may try to detect 506 and resolve a hash collision. For example, the hash collision could be resolved by checking further information in the media stream reports of the result set for parameters that identify the media stream (report) that belongs to the correlation key that has been queried. For example, in case the media stream reports contain timestamps of the beginning and/or end of the media stream, same could be compared to respective timestamps contained in the signaling session report, which yield the beginning and/or end of the signaling session. The media stream report(s) of media stream(s) that start before or end after the signaling session may be obtained from the database due to a hash collision. Accordingly, the correlation unit 402 may select 507 only the most relevant media stream report, i.e. the media stream report that is most likely corresponding to the service of the signaling session report from the result set and may add 508 at least a part of its information to the service report. Further, the correlation unit checks 509 whether there is a further correlation key contained in the signaling session report and, if so (yes), repeats steps 503 to 508. These steps are repeated for each further correlation key(s) comprised in the signaling session report.

Once all correlation keys contained in the signaling session report have been processed, the service report for the signaling session is complete, and may be optionally stored 510 by the correlation unit 402 in a service report database.

Depending on the correlation type or application, the procedure of FIG. 5 could be supplemented with additional steps. For example, in case of a proactive/periodic correlation, the correlation unit 402 may check whether there is another signaling session report to be matched to its corresponding media stream reports, and if so the procedure of FIG. 5 would be executed for each signaling session report to be processed. In case of performing a correlation on demand, the correlation unit 402 may likewise check whether there is another signaling session report to be matched to its corresponding media stream reports, and if so the procedure of FIG. 5 would be executed for each signaling session report to be processed. Once all signaling session reports have been processed the correlation unit 402 may generate a correlation response message comprising the service reports generated by the correlation unit 402 in response to the search criteria provided in a correlation request, and returns the correlation response message to the querying entity, e.g. another device/computer.

Signaling Plane Probe

Figure 7:
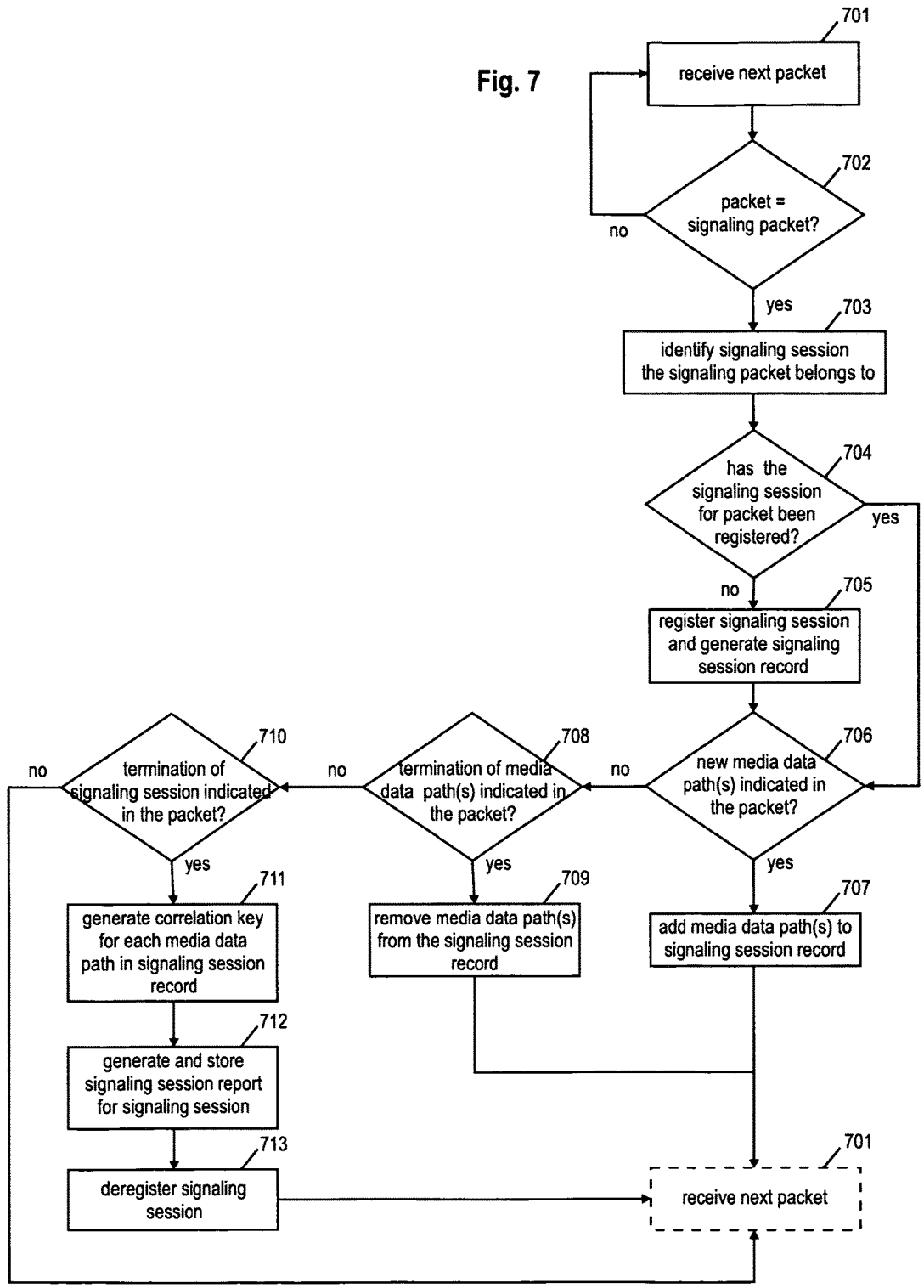
FIGS. 7 & 8 shows two exemplary flow charts of the operation of a signaling plane probe according to different exemplary embodiments of the invention.
Figure 8:
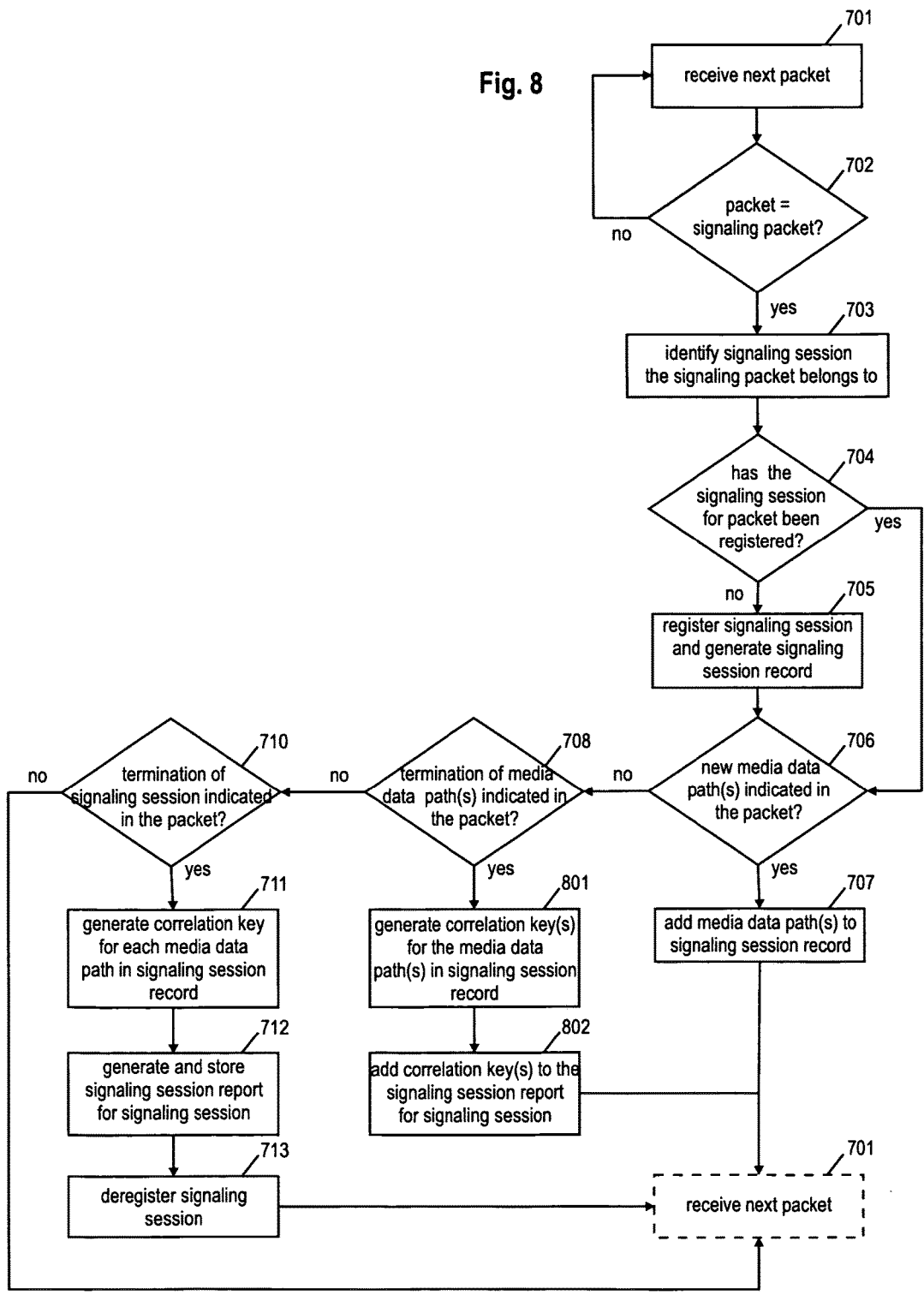
Figure 9:
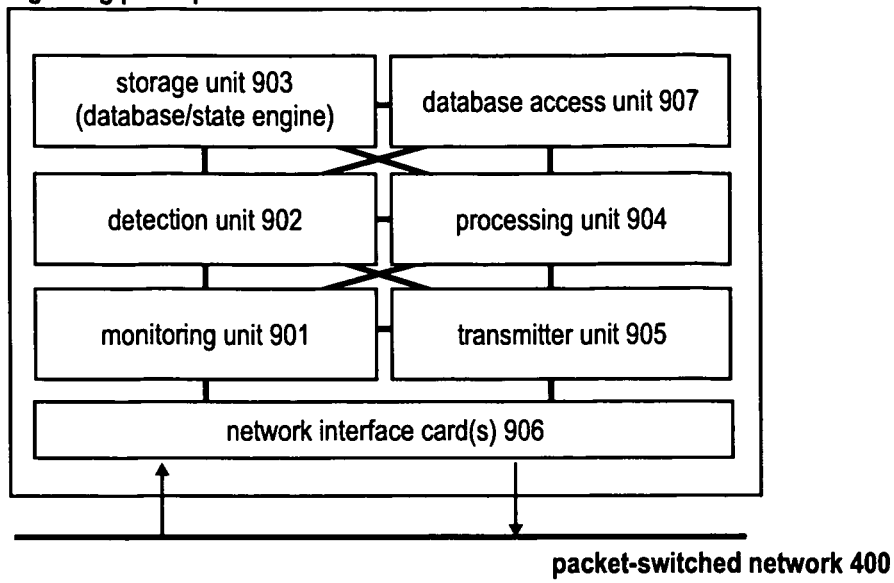
FIG. 9 shows the structure of a signaling plane probe according to an embodiment of the invention.

FIG. 9 shows an exemplary implementation of a signaling plane probe 401 and FIGS. 7 and 8 show two exemplary flow charts of the operation of same according to different embodiments of the invention. In general, the signaling plane probe 401 observes one or more network links to obtain a copy of all packets passing these network links/interfaces. For this purpose, the signaling plane probe 401 comprises a monitoring unit 901 that receives 701 packets of a service on the packet-switched network 400. For example, this monitoring unit 901 may receive the packets from a one or more specialized packet capture cards 906 (network interface card—NIC) which is capable of receiving and processing packets on the physical interface and to provide them to the application layer, nearly without requiring CPU processing time and operation system functionality. An optional filter in each packet capture card of the signaling plane probe 401 may be used to prevent unwanted packets from being copied from the network interfaces to the processing processes. These filters may be for example implemented as stateless or stateful Internet Protocol (IP) or payload filters. For example, this filter may check 702, whether the currently processed packet is a signaling packet or not. If the packet does not belong to a signaling session, i.e. is not packet of a signaling related protocol, the next packet may be processed.

Each signaling packet received at the signaling plane probe 401 will be processed by a detection unit 902 which analyzes the contents of the packets provided by the monitoring unit 901 so as to identify and process packets as signaling packets. Specifically, the detection unit 902 detects signaling packets and matches these to signaling sessions of the media service, and is capable of identifying one or more media data paths of a media plane of the service based on signaling information of the service comprised in the received packets. Optionally, the detection unit 902 may be provided in one or more specialized packet capture cards.

For example, the detection unit 902 identifies packets containing signaling information (signaling packets) in a parsing process based on their header information. If parsed successfully as a signaling packet, the signaling packet is forwarded to a state engine. The state engine is designed to identify 703 and form signaling sessions from individual signaling packets.

The state engine (which may be considered an internal database with correlation related information maintained in the storage unit 903) of the detection unit 902 has a processing facility and a state table which holds information about signaling sessions (signaling session records). Based on the protocol-specific identifiers in the signaling packets the detection unit 902 can identify the start and end of a signaling session, respectively media service, or "append" a respective processed signaling packet to an existing signaling session. Signaling packets may also contain information on the start and termination of media streams in the media plane of the media service, which are events that may be tracked by the detection unit 902. Depending on whether the identified signaling session is already registered in the signaling plane probe 401 (step 704), the detection unit 902 registers 705 the new signaling session in the state table, including the generation of a new signaling session record for the signaling session.

The signaling session record may be supplemented with information on the signaling session while same is running to account—for example—for endpoint address/name (e.g. SIP URI); the phone number of the user; the user-agent (endpoint software and version); capabilities/features; supported media types; IP addresses and ports for signaling and media streams (from SDP body); signaling routing information; timestamps: e.g. session start, Post-Dial-Delay (PDD), connect time, session end; information on the session flow (e.g. signaling message(s) with timestamps); session state (e.g. successful, unsuccessful, timed out, reason for failure), and/or events during session (media on hold, codec renegotiation, session forking, authentication), etc.

Furthermore, by analyzing 706 the contents of the signaling packets, e.g. a SDP body of a SIP messages comprised in signaling packets, the detection unit 902 may further learn one or more media data paths of the media plane of the service belonging to the media service that is associated to a given signaling session. The signaling plane probe 401 may further comprise a storage unit 903, e.g. a volatile memory, to store the information describing the state of the respective signaling sessions in the state table. In case the signaling packet indicates the start of a new media stream (step 706: yes), the detection unit 902 may add 707 information on the media data path (e.g. IP address and port number of the destination, and optionally the source of the media stream) of this media stream to the signaling session record. Likewise, in case the signaling packet indicates the end/termination of a new media stream (step 708: yes), the detection unit 902 may remove the information on the respective media stream from the signaling session record maintained in storage unit 903. In case the signaling packet indicates the termination of the signaling session (step 710: yes), the detection unit 902 may either itself or trigger the processing unit 904 to generate 711 a respective correlation key for each media data path indicated in the signaling session record. The correlation key for a respective media data path of a media stream may be generated for example based on information on the directivity of the media stream (e.g. as given by the tuple of destination IP address and UDP port number) and a timestamp indicating the point in time at which the signaling session was terminated. For example, this timestamp may indicate the point in time of reception of the signaling packet indicating the event of the termination of the signaling session at the signaling plane probe 401. For example, the network interface card(s) 906 of the signaling plane probe could generate a timestamp indicating the time of reception of the respective signaling plane packet and could make same available to the other components of the signaling plane probe 401. Furthermore, the detection unit 902 or the processing unit 904 may further generate 912 a signaling session report based on the information on the signaling session gathered in the signaling session record. Further, the signaling session report also included the correlation keys for the media data paths of the service that exist at the end of the service according to the signaling plane information. The signaling session report may then be stored in a signaling session report database, for example using the database access unit 907 of the signaling plane probe 401. Moreover, the signaling session is deregistered 713 from the state table.

Once a given signaling packet has been processed, it may be discarded. It should be also noted that the order of the checks in steps 706, 708 and 710 and the respective actions to be taken is only exemplary. It is only important that the information on the media streams of the service that exist in the media plane are tracked by the signaling plane probe 401, and that the signaling plane probe 401 is able to detect the termination of the signaling session.

Optionally (not shown in FIG. 7), in another exemplary embodiment, the detection unit 902 of the signaling plane probe 401 periodically (e.g. every 5, 10 or 15 seconds) traverses all entries in the state table in order to find and clean up stale signaling sessions. For this purpose, the signaling plane probe 401 may add a timestamp to each signaling session record in the state table that is updated each time a new signaling packet/message of the respective signaling session is received. Based on this timestamp allows to identify stale signaling session by simply checking based on the signaling sessions' timestamps whether the last signaling packet/message for a given signaling session has been received longer than a threshold time period ago. For example, stale sessions might be those which did not receive new signaling packets/messages for 86400 seconds or signaling sessions may be defined stale and are terminated after a certain time. This clean-up removes unnecessary information from the state.

FIG. 8 shows another flow chart of the operation of a signaling plane probe 401 according to another embodiment of the invention. In the example discussed with respect to FIG. 7, the signaling plane probe 401 keeps track of the media streams currently existing in the media plane of the service, eliminating those media streams from the signaling session record that are terminated during the ongoing signaling session/service. In the flow chart of FIG. 8, which is corresponding to FIG. 7 to a large extent, the termination of one or more media streams in the media plane, as detected in step 708, causes the detection unit 902 or the processing unit 904 (triggered by the detection unit 902) to generate 801 a correlation key for each terminated media stream. Similar to the other correlation keys, the correlation key for a terminated media stream may be generated based on its media data path information (e.g. destination IP address and UDP port number) and a timestamp that indicates the point in time the media stream was terminated. This timestamp may indicate the point in time of reception of the signaling packet indicating the event of the termination of the media stream at the signaling plane probe 401. The correlation key generated is then added 802 to the signaling session record of the signaling session by the detection unit 902 or the processing unit 904 and is later then also stored in the signaling session report in step 712 together with the other correlation keys either generated in step 801 or step 711.

Media Plane Probe

Figure 10:
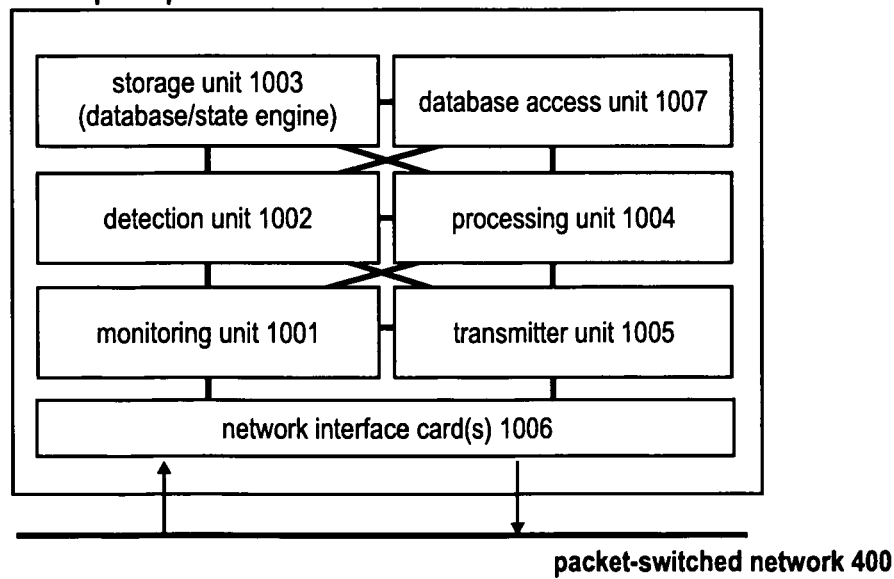
FIG. 10 shows the structure of a media plane probe according to an embodiment of the invention.
Figure 11:
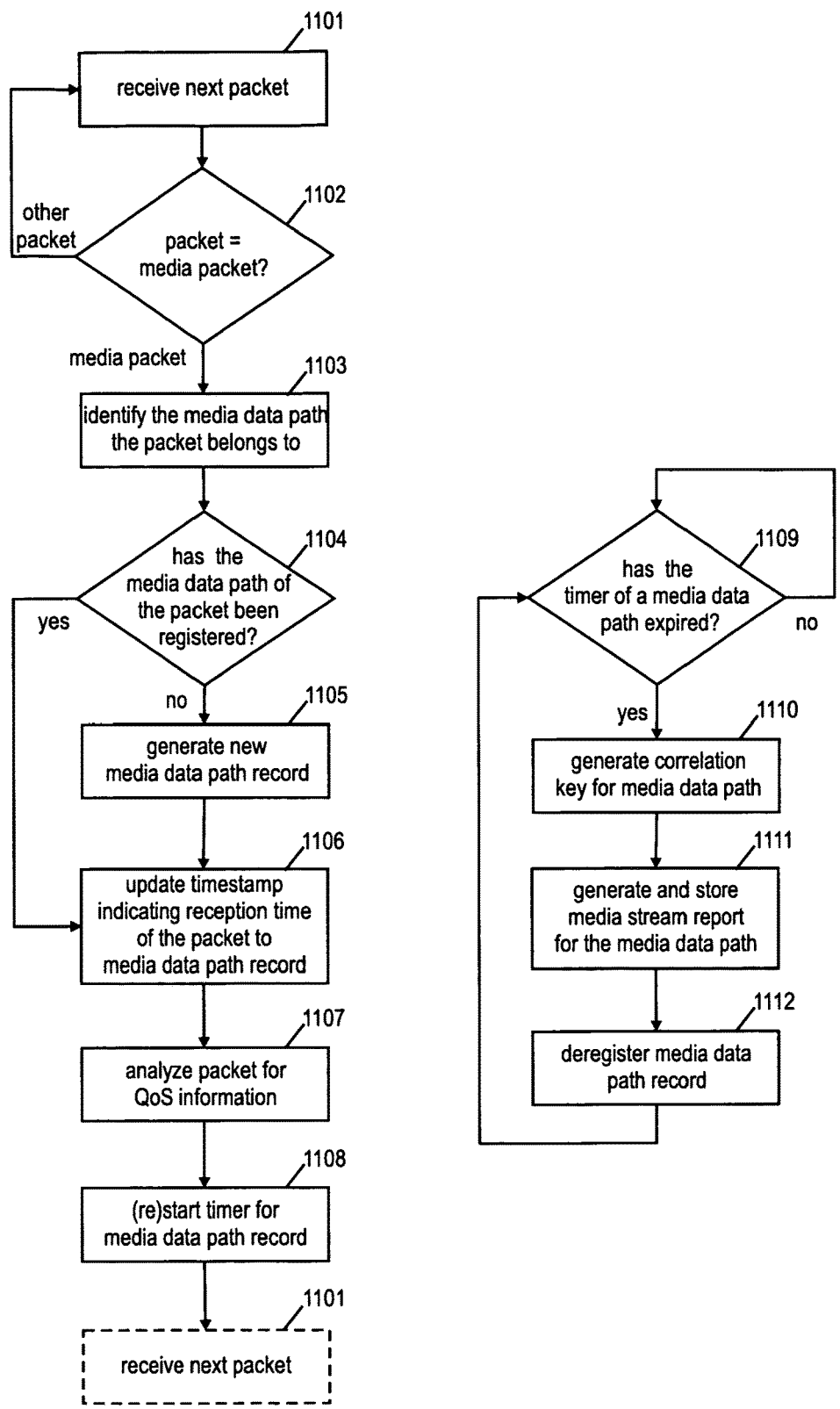
FIG. 11 shows a flow chart of the operation of a media plane probe according to an embodiment of the invention.

Next, the media plane probe 403 according to an exemplary embodiment of the invention is described with respect to FIG. 10 and FIG. 11. FIG. 10 shows an exemplary embodiment of a media plane probe 403, while FIG. 11 shows a flow chart of its exemplary operation according to an embodiment of the invention.

Similar to the signaling plane probe 401, the media plane probe 403 observes one or more network links to obtain a copy of all packets passing these interfaces. The media plane probe 403 may observe one or more network links to obtain a copy of all packets passing these interfaces. The media plane probe 403 comprises a monitoring unit 1001 that receives 1101 packets of a service on the packet-switched network 401. For example, this monitoring unit 1001 received the packets from one or more specialized packet capture cards 1006 (network interface card—NIC) which are capable of receiving and processing packets on the physical interface and to provide them to the application layer, nearly without requiring CPU processing time and operation system functionality. An optional filter in the packet capture card of the media plane probe 403 may be used to prevent unwanted packets from being copied from the network interfaces to the processing processes. This filter may be for example implemented as stateless or stateful Internet Protocol (IP) or payload filter. For example, this filter may check 1102, whether the currently processed packet is a media plane packet (media packet) or is some other packet. If the packet does not belong to the media plane, i.e. is not packet of a media related protocol, such as for example RTP, the next packet may be processed.

Each media packet received will be processed by the media plane probe 403. The detection unit 1002 of the media plane probe 403 is designed to detect and form media streams from single media packets. The media plane probe 403 may further comprise a processing unit 1002 that may hold a state table which stores information about the media streams monitored by the media plane probe 403 in a local storage unit 1003, e.g. a volatile memory. Based on the protocol-specific identifiers in the media streams the media plane probe 403 (e.g. based on header information in the RTP packets and/or lower layer headers) the detection unit 1002 identifies 1103 the media data path, i.e. the media stream, the media packet belongs to. If the media data path has not been yet registered (step 1104: no), i.e. the processed media packet starts a new media stream (with the given media data path) the detection unit 1002 generates a new media data record in the state table to account for the new media data path observed by the media plane probe 403. This media stream record may contain information on the media stream such as for example the destination (and optionally the source) IP address and port combination of the media stream, the SSRC in the packet header (in case RTP is used for media transport), etc. If the media data path is already known (step 1104: yes), the media stream record already exists. In any case, the detection unit 1002 updates a timestamp 1106 in the media stream record to indicate the point in time at which the last media packet of the media stream has been received. This timestamp may be used for calculating the correlation key for the media stream. Furthermore, the detection unit 1002 may (re)start a timer 1108 for the media stream record, which when timing out is indicating the termination of the media stream as will be outlined below. Alternatively, no timer is used, but the media plane probe 403 periodically checks for media streams the last media packet of which was received more than a threshold time period ago, in order to determine terminated media streams.

The media stream records of the media streams may for example indicate the respective media data paths thereof by an IP address and port tuple of the destination device, i.e. the receiving device of the media stream. The media plane probe's detection unit 1002 stores information describing the state of the detected media streams in the media stream records maintained in the state table. Optionally, the individual media streams (i.e. their media data paths) may be identified by a media path identifier (e.g. stream hash key) as unique key. Further optionally, upon detecting a new media stream, respectively media path (step 1104: no), the processing unit 1004 could generate 1105 a media path identifier (e.g. a media path identifier (e.g. stream hash key)) for the media stream, respectively media path and stores 1106 the media stream record in the state table as outlined above.

Optionally, the processing unit 1004 could analyze every received packet for quality information 1107 and—further optionally—store them in the storage unit 1003 for a given time period. Periodically the processing unit 1004 may aggregate or compress the quality information to form fine-grained media stream quality reports with media stream related information. Fine-grained media stream quality reports could be for example written in predetermined time intervals, e.g. every five seconds, and could provide a summary of the media stream in the respective interval and the aggregated quality information of the media stream in the respective interval. Upon generation of a respective fine-grained media stream quality report, the packets used for the generation of this fine-grained media stream quality report can be removed from the storage unit 1003.

The processing unit 1004 of the media plane probe may for example periodically check 1109 (e.g. every 5, 10 or 15 seconds); whether a timer set of a media stream (record) in step 1108 has expired. Alternatively, as noted above, the media plane probe 403 may also check timestamps indicating the last update (i.e. last reception of a media packet) of the respective media stream reports in the state table. A media stream may be for example considered terminated, if no new media packets have been received by the monitoring unit 1001 for the existing media stream for a given amount of time (e.g. 60 seconds). Accordingly, if using a timer to monitor the termination, the timer value could be set to this given amount of time. Further alternatively, instead of periodically checking the media stream records or expiry of their timers, the expiry of a timer for a media stream (record) could cause an interrupt invoking the processing unit 1004 to perform steps 1110 to 1112 as outlined below.

Upon detecting the termination of a media stream, the processing unit 1004 processes the respective information in the media stream record of this media stream the state table. The processing unit 1004 generates 1110 a correlation key for the media stream based on its media data path information (e.g. the destination IP address and UDP port number) and the timestamp in the media stream record that is indicating the point in time of receiving the last media packet of the media stream (see step 1106). Furthermore, the processing unit 1004 generates 1111 a media stream report for the media data path, respectively media stream, which includes the generated correlation key and further information on the media stream.

This further information may be for example transport media information and optionally stream quality information. For example, in case RTP is used for media transport, the transport media information could include the source and destination IP address of the RTP stream, the source and destination UDP port of the RTP stream, the RTP header Synchronization source (SSRC) value and the RTP payload type. Furthermore, the processing unit 1004 may also generate information on the media stream quality that is included to the media stream report as stream quality information. This stream quality information could for example include timestamp information (e.g. start and/or end time of the media stream), an indication of RTP format violations (e.g. the number thereof), information on the protocol conformance (e.g. sequence errors and/or DSCP errors), and transport information (e.g. packet interval and jitter statistics, information on packet loss, information on duplicate packets, etc.), MOS values (e.g. per time-slice (e.g. every 5 seconds), minimum/average/maximum value for entire stream duration, etc.), and/or events (e.g. comfort noise, silence suppression, DTMF tones, codec changes, marker bits). The contents of the media stream reports may be configurable by an operator and may be adapted to customers' needs.

The media stream record may be further stored in a media stream report database using the database access unit 1007 of the media plane probe 403. Finally, the processing unit 1004 of the media plane probe 403 deregisters 1112 the media data path from the state table, e.g. by deleting the corresponding media stream record.

Steps 1110 to 1112 are performed for every media stream that is considered terminated by the media plane probe.

Optimizations may be used to speed up processing of entries in the state tables inside the signaling plane probe 401, the correlation unit 402 and the media plane probe 403. A simple list would be sufficient to implement the features as outlined above. Add, modify, delete and search operations on simple lists may however be too slow. These operations may be implemented utilizing more complex but faster data structures, e.g. hash tables or data structures heavily dependent on CPU and Operating System specific behavior and functionality. The Intel Thread Building Block (TBB) library for instance can be used to implement in-memory databases used for the state tables in the signaling plane probe 401, the correlation unit 402 and the media plane probe 403. The Intel Thread Building Block (TBB) library may also be used to aid implementation of the processing queues inside and in between the components outlined above.

Please note that in case the signaling plane probe 401 and the media plane probe 403 should perform passive non-intrusive monitoring of the signaling plane traffic, respectively media plane traffic, a separate network interface card is employed for the transmission of correlation related messages (i.e. the network interface card(s) for monitoring the traffic are only employed for packet reception but not for packet transmission).

Please also note that in the procedures described above the detection unit 902, 1002 and the processing unit 904, 1004 may use the database access unit 907, 1007 to access the database/state table in the storage unit 903, 1003.

Application

The correlation mechanism for signaling plane and media plane of a service may be used in manifold applications. For example, the correlation mechanism is useful in small networks but is more important in larger scale networks where the various signaling and media components are decomposed and present on different, sometimes geographically split, network entities. This is the case in IP Multimedia Subsystem (IMS) or Next Generation Network (NGN) setups.

Figure 12:
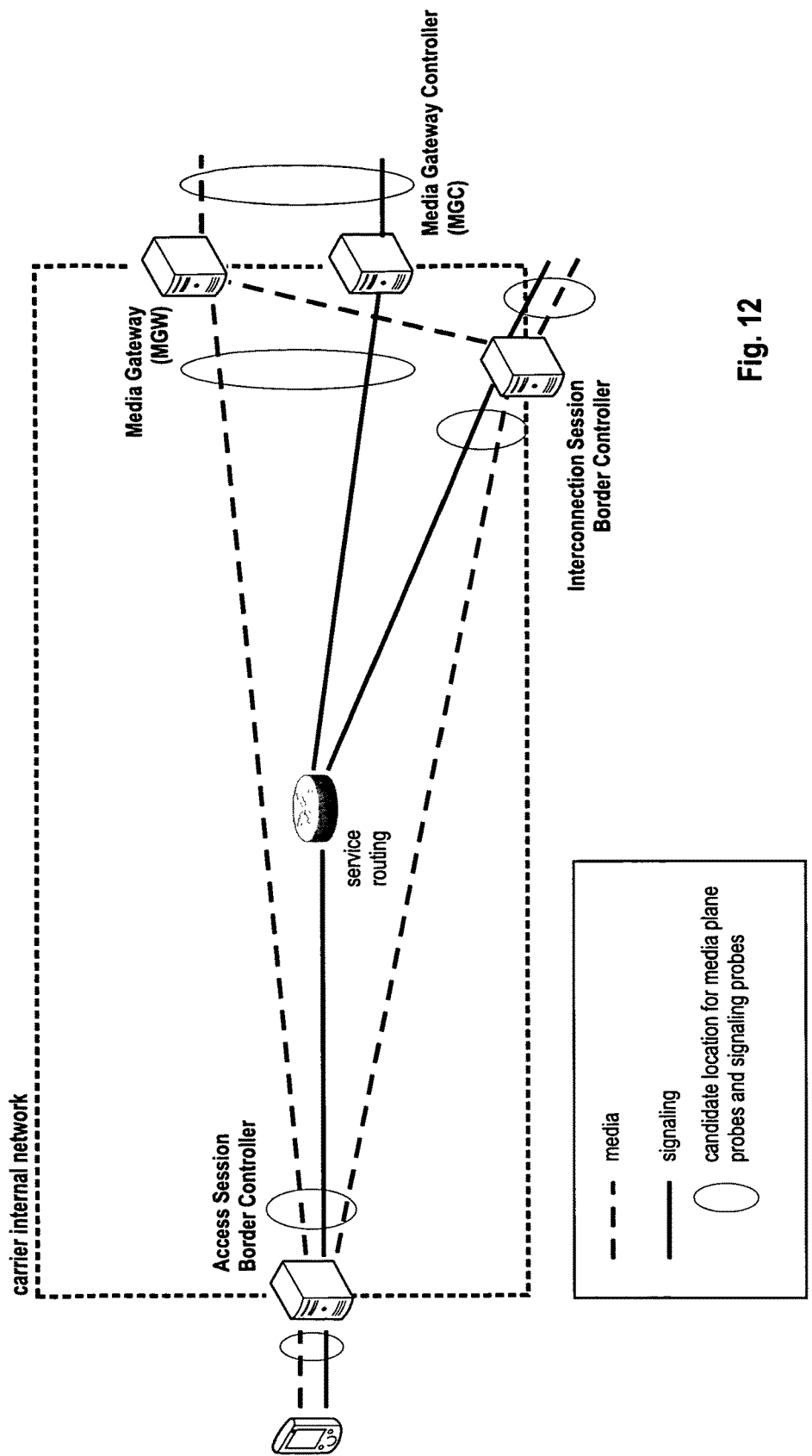
FIG. 12 shows a network in which locations are indicated, where signaling and media plane probes of the invention may be advantageously located according to an embodiment of the invention.

FIG. 12 shows a simplified network in which locations are indicated where correlation may be desired and can be implemented using the correlation mechanism according to one of the various embodiments described herein. Possible monitoring locations are for example (and not limited thereto):

The Access Session Border Controller (SBC) network interfaces with end customers (shown of the left side of FIG. 12), a decomposed gateways system, e.g. to the PSTN, is shown as Media Gateway (MGW) and a Media Gateway Controller (MGC)—see In the top right section of FIG. 12, and an Interconnection SBC interfaces to one or more interconnection or transit partners (see the lower right side of FIG. 12.

It should be noted that the location of the monitoring probes for signaling plane and media plane may also be subject to requirements on the monitoring solution.

In some cases, signaling plane and media plane may originate and/or terminate at the same endpoint (device). In case of an end customer this endpoint most likely uses the same IP address on the signaling and media plane. These streams may be for example observed, if the signaling plane probes 401 and the media plane probes 403 are placed close to the end customer devices. The Access Session Border Controller may be considered to be close to the carrier internal network's "border" towards end customer devices and to therefore receive traffic from the end customers on one side and transmits this traffic on the other side towards the carrier internal network. Most commonly these Session Border Controllers (SBC) are used to separate the devices outside the own trust domain from the inside network. Although the traffic is in one geographic location the SBC may use different IP addresses to load balance traffic. In this case a simple IP address based correlation mechanism not using the principles and ideas outlined herein would already fail whereas the correlation mechanism described herein would succeed. The signaling plane probes 401 and media plane probes 403 may be for example placed in a way that they observe the signaling streams and media streams respectively.

In the upper right corner of the diagram shown in FIG. 12, a decomposed gateway is shown which uses different physical entities as media and signaling components (MGC and MGW, respectively). In between those devices a third party protocol may be used to synchronize the devices. For the sake of a minimum size network diagram only one of each component types is shown but in real life scenarios multiple media components are controlled by one signaling component (as it is the case in IMS, NGN). The media components may be co-located in the same location with the signaling component or spread across the internal network of the carrier. In either case the correlation task is rather complex as it involves multiple IP addresses on different physical network links and thus may require multiple signaling plane probes 401 as well as media plane probes 403.

In a third exemplary scenario the correlation has to correlate signaling and media streams from different locations. A media plane probe 403 component on the internal side of the interconnection point (lower right corner of the diagram—Interconnection SBC) observes a media stream from the Access SBC (middle left). The corresponding signaling session is observed next to the aforementioned Access SBC by a separate signaling plane probe 401.

The location of the correlation unit 402 does not impact what signaling sessions or media streams can be correlated. The correlation unit 402 should have access to the signaling session reports and media stream reports of the signaling plane probes 401 and media plane probes 403 and can be implemented as distinct physical machine or co-located on an existing signaling plane probe 401 or media plane probe 403.

The terms probe and correlation unit used herein can be considered to refer to dedicated hardware, a software program or a combination thereof to implement the desired functionality of the respective probe, respectively, correlation unit. Accordingly, another embodiment of the invention relates to the implementation of the above described various embodiments using hardware and software. It is recognized that probes and correlation unit of the invention may be implemented by having computing devices (processors) execute a software program that causes the desired functionality being executed. A computing device or processor may for example be general purpose processors, digital signal processors (DSP), application specific integrated circuits (ASIC), field programmable gate arrays (FPGA) or other programmable logic devices, etc. Some of the computing devices may store the software program internally.

The various embodiments of the invention may also be performed or embodied by a combination of computing devices and software programs providing the desired functionality stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method comprising:
a) providing a signaling plane probe operatively connected to a network for monitoring signaling sessions of different services on the network and generating, for a monitored signaling session of one of said services that is passively monitored by the signaling plane probe, a correlation key for each of at least two directions of media data paths of said monitored service based on information of the signaling session of said monitored service, wherein the at least two correlation keys generated for said monitored service are generated by the signaling plane probe using a timestamp indicative of a point in time at which an end of the respective signaling session of the respective service has been detected by the signaling plane probe and using information on a direction of the respective service;
b) storing, by the signaling plane probe and for each signaling session monitored by the signaling plane probe, a signaling session report in one or more databases, wherein the signaling session report for said monitored signaling session of said one of said services that is passively monitored by the signaling plane probe comprises the at least two correlation keys generated for the at least two directions of the media data paths of said monitored service;

c) providing a media plane probe operatively connected to the network for monitoring media streams on the network of at least one of said media data paths of said one of said services that is monitored by the signaling plane probe and generating for each media stream passively monitored by the media plane probe, a correlation key, wherein the correlation key is generated by the media plane probe using a timestamp indicative of a point in time at which a respective media stream has ended and using information on the media data path of the respective media stream, d) storing, by the media plane probe and for each said media stream being monitored by the media plane probe, a media stream report in the one or more databases, wherein each said media stream report comprises at least the correlation key generated for the respective media stream, and e) providing a correlation unit operatively associated with the one or more databases and adapted for correlating the media streams and the signaling sessions by matching the correlation keys comprised within media stream reports and signaling session reports, respectively.

2. The method according to claim 1, wherein the generation of the respective correlation keys for the respective media streams by the media plane probe is based on the media data path information of the respective media stream and the timestamp indicative of the point in time at which the respective media stream ended.

3. The method according to claim 1 or 2, wherein information on the direction of said one of said services that is passively monitored by the signaling plane probe is information on one or more media data paths of media streams of the said monitored service learned from messages of the signaling session of said monitored service.

4. The method according to claim 1 or 2, further comprising:

f) monitoring, by the signaling plane probe, signaling messages of the respective signaling sessions of the services, and g) detecting, by the signaling plane probe, media streams belonging to each service associated to a respective monitored signaling session based on the signaling messages of the respective signaling sessions, wherein the at least two correlation keys are generated based on information on the media data path of the media streams belonging to said monitored service associated to one of the signaling sessions and the timestamp indicative of the point in time at which the end of the one signaling session has been detected by the signaling plane probe.

5. The method according to claim 1 or 2, wherein information on a media data path of a media stream is a destination IP address and port number of the media stream.

6. The method according to claim 1 or 2, wherein the timestamps used for the generation of the correlation keys by the signaling plane probe and the media plane probe are rounded before the generation of the correlation keys or have a granularity in the range of one to ten seconds.

7. The method according to claim 1 or 2, wherein the signaling plane probe generates for each direction of said one of said services that is passively monitored by the signaling plane probe at least one correlation key using a timestamp indicative of the point in time at which the end of the respective signaling session of said monitored service has been detected by the signaling plane probe and being rounded to the next lower timestamp value according to a rounding interval, and at least another correlation key using the timestamp indicative of the point in time at which the end of the respective signaling session of the said monitored service has been detected by the signaling plane probe and being rounded to the next higher timestamp value according to the rounding interval.

8. The method according to claim 1 or 2, wherein the media plane probe generates for each media stream at least one correlation key using a timestamp indicative of the point in time at which the respective media ended and being rounded to the next lower timestamp value according to a rounding interval, and at least another correlation key using the timestamp indicative of the point in time at which the respective media stream ended and being rounded to the next higher timestamp value according to the rounding interval.

9. The method according to claim 1 or 2, wherein the correlation of the media streams and the signaling session of the respective services is performed periodically or in response to a query.

10. The correlation device according to claim 1, wherein the correlation keys provided in a respective one of the signaling session reports have been generated using a timestamp indicative of a point in time at which an end of a respective signaling session of a corresponding one of the services has been detected and using information on media streams of said corresponding one of the services.

11. The correlation device according to claim 1, wherein a correlation key provided in a respective one of the media stream reports has been generated using a timestamp indicative of a point in time at which a respective media stream has ended and using information on the media data path of the respective media stream.

12. The correlation device according to claim 1, wherein correlating the media streams and the signaling sessions of said one or more services comprises: identifying identical correlation keys comprised in respective ones of said media stream reports and comprised in the signaling session reports, wherein identical correlation keys of a one of the media stream reports and one of the signaling session reports yield the media stream of said one media stream report belonging to the same service to which the signaling session of said one signaling session report belongs.

13. The correlation device according to claim 1, wherein the service report comprises information on the service and the quality information of the media streams of the service.

14. The correlation device according to claim 1, wherein correlating the media streams and the signaling sessions of one or more services based on the correlation keys comprised within media stream reports of the media streams and signaling session reports of the signaling sessions comprises: obtaining from a signaling session report correlation keys identifying the media streams belonging to the same service as the signaling session, and identifying those media stream reports which include one of the correlation keys obtained from the signaling session report.

15. The correlation device according to claim 1, wherein correlating the media streams and the signaling sessions of one or more services based on the correlation keys comprised within media stream reports of the media streams and signaling session reports of the signaling sessions comprises: obtaining from a media stream report a correlation key identifying the media stream, and identifying a signaling session report among the signaling session reports which includes the same correlation key obtained from the signaling session report.

16. The method correlation device according to claim 1, wherein steps a) and b) are performed periodically for all signaling session reports and media stream reports generated within a configurable time interval, or in response to a request.

17. The correlation device according to claim 1 further comprising:
 a) generating at least one correlation key for each direction of a service based on information of the signaling session of the respective service monitored at the signaling plane probe, wherein the correlation keys for a respective service are generated using a timestamp indicative of the point in time at which the end of the respective signaling session of the respective service has been detected by the signaling plane probe and using information on the direction of the respective service;
 b) storing, by the signaling plane probe, a signaling session report for each signaling session in a database, wherein each signaling session report comprises the at least two correlation keys generated for the respective directions of the service;
 c) generating a correlation key for each media stream monitored by the media plane probe, wherein the correlation key is generated using a timestamp indicative of the point in time at which the respective media stream has ended and using information on the media data path of the respective media stream; and
 d) storing, by the media plane probe, a media stream report for each media stream in a database, wherein each media stream report comprises at least the correlation key generated for the respective media.

18. A passive mid-point monitoring apparatus comprising: a network interface card operatively connected to a packet-switched network for receiving packets of signaling sessions of multiple media services, and a processor adapted to monitor the signaling sessions based on the packets of the signaling sessions received by the network interface card to thereby obtain information on a respective one of the signaling sessions, wherein the processor is further adapted to automatically detect a point in time at which a respective one of said signaling sessions of a respective one of the multiple media services terminates, and wherein the processor is adapted to generate at least one correlation key for each direction of a respective one of said multiple media services based on a timestamp indicative of the detected point in time at which the end of the respective signaling session of the respective one media service has been detected by the processor and based on information on a direction of the respective one media service,
 wherein the processor is further adapted to store a signaling session report for each signaling session in a database, wherein each signaling session report comprises correlation keys generated for each direction of the media service.

19. A passive mid-point monitoring apparatus comprising: a network interface card operatively connected to a packet-switched network for receiving packets of media streams of multiple media services, a processor adapted to monitor the media streams based on the packets of the media streams received by the network interface card to thereby obtain information on a media data path a respective one of the media streams, wherein the processor is further adapted to automatically detect in real-time a point in time at which a respective one of the media streams of a respective one of the media services terminates, and wherein the processor is adapted to generate a correlation key for each media stream monitored by the processor, wherein the correlation key is generated using a timestamp indicative of the detected point in time at which the respective one media stream has ended and using information on a media data path of the respective one media stream, and wherein the processor is further adapted to store a media stream report for each media stream in a database, wherein each said media stream report comprises at least the correlation key generated for the respective media service.

20. A correlation device comprising:
 a database access unit adapted to access one or more databases containing signaling session reports for signaling sessions of one or more services generated by a signaling plane probe and media stream reports of media streams of the said one or more services generated by media plane probe, wherein each of the signaling session reports contains at least one correlation key for each direction of a respective one of said one or more services, and each of the media stream reports contains one correlation key indicative of a direction of a media stream of the respective media stream report,
 a processor is operatively coupled to the database access unit and adapted to automatically correlate the media streams and the signaling sessions of the one or more services by identifying identical correlation keys comprised within the media stream reports and the signaling session reports to thereby recognize at least two of said media stream reports and one of said signaling session reports belonging to a respective one of said one or more services, and wherein the processor is further adapted to generate a service record for a respective one of said one or more services based on information contained in the media stream reports and based on information contained the signaling session report of said respective one service.

21. A passive monitoring system for correlating media streams and signaling sessions of services in a packet-switched network, comprising:
 a signaling plane probe operatively connected to the packet-switched network for monitoring signaling sessions of different services on the network and generating, for a monitored signaling session of one of said services that is passively monitored by the signaling plane probe, a correlation key for each of at least two directions of media data paths of said monitored service based on information of the signaling session of said monitored service, wherein the at least two correlation keys generated for said monitored service are generated by the signaling plane probe using a timestamp indicative of a point in time at which an end of the respective signaling session of the respective service has been detected by the signaling plane probe and using information on a direction of the respective service, the signaling plane probe storing for each signaling session monitored by the signaling plane probe, a signaling session report in one or more databases, wherein the signaling session report for said monitored signaling session of said one of said services that is passively monitored by the signaling plane probe comprises the at least two correlation keys generated for the at least two directions of the media data paths of said monitored service,
 a media plane probe operatively connected to the network for monitoring media streams on the network of at least one of said media data paths of said one of said services that is monitored by the signaling plane probe and generating for each media stream passively monitored by the media plane probe, a correlation key, wherein the correlation key is generated by the media plane probe using a timestamp indicative of a point in time at which a respective media stream has ended and using information on the media data path of the respective media stream, the media plane probe storing for each said media stream being monitored by the media plane probe, a media stream report in the one or more databases, wherein each said media stream report comprises at least the correlation key generated for the respective media stream; and a correlation unit operatively associated with the one or more databases and adapted for correlating the media streams and the signaling sessions by matching the correlation keys comprised within media stream reports and signaling session reports, respectively.

* * * * *